United States Patent
Dickey et al.

(10) Patent No.: US 10,800,511 B2
(45) Date of Patent: Oct. 13, 2020

(54) END SEAL DEVICE FOR A HIGH-LIFT DEVICE OF AN AIRCRAFT

(71) Applicant: The Boeing Company, Chicago, IL (US)

(72) Inventors: Eric David Dickey, Long Beach, CA (US); Norman Henry Princen, Long Beach, CA (US); Pichuraman Sundaram, Lake Forest, CA (US); Dharmendra Nathubhai Patel, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 15/994,290

(22) Filed: May 31, 2018

(65) Prior Publication Data

US 2019/0367156 A1    Dec. 5, 2019

(51) Int. Cl.
*B64C 23/00* (2006.01)
*B64C 9/24* (2006.01)
*B64C 7/00* (2006.01)
*F16B 1/02* (2006.01)
*B64C 39/10* (2006.01)

(52) U.S. Cl.
CPC .............. *B64C 7/00* (2013.01); *B64C 23/005* (2013.01); *F16B 1/02* (2013.01); *B64C 9/24* (2013.01); *B64C 39/10* (2013.01); *B64C 2039/105* (2013.01)

(58) Field of Classification Search
CPC .... B64C 3/50; B64C 9/22; B64C 9/24; B64C 9/26; B64C 9/12; B64C 9/36
See application file for complete search history.

(56) References Cited

U.S. PATENT DOCUMENTS

| | | | |
|---|---|---|---|
| 2,927,749 A | 3/1960 | Brownell | |
| 3,486,720 A | 12/1969 | Seglem | |
| 3,499,622 A | 3/1970 | Lugan | |
| 3,968,946 A * | 7/1976 | Cole | B64C 7/02 244/214 |
| 4,189,120 A | 2/1980 | Wang | |

(Continued)

FOREIGN PATENT DOCUMENTS

DE    102006036389    2/2008

OTHER PUBLICATIONS

EPO, European Search Report for Appl. No. EP19176411, dated Aug. 27, 2019.

*Primary Examiner* — Philip J Bonzell
*Assistant Examiner* — Tye William Abell

(57) ABSTRACT

An end seal device for a high-lift device on an airfoil leading edge of an airfoil includes an end seal body configured to be coupled to the airfoil and having a seal body spanwise portion and a seal end. The end seal body is configured to be in a seal extended position when the high-lift device is in a device extended position. The seal body spanwise portion is disposed adjacent to the aircraft body or the airfoil leading edge and the seal end is disposed adjacent to a device end of the high-lift device when the end seal body is in the seal extended position and the high-lift device is in the device extended position. The end seal body in the seal extended position fills a discontinuity otherwise occurring between the device end and the aircraft body or airfoil leading edge if the end seal body were omitted.

20 Claims, 28 Drawing Sheets

(56) References Cited

U.S. PATENT DOCUMENTS

| | | | |
|---|---|---|---|
| 4,384,693 A * | 5/1983 | Pauly | B64C 9/22 |
| | | | 244/130 |
| 4,471,925 A | 9/1984 | Kunz | |
| 6,021,977 A * | 2/2000 | Khavari | B64C 9/12 |
| | | | 244/87 |
| 6,152,404 A * | 11/2000 | Flaig | B64C 9/24 |
| | | | 244/130 |
| 7,424,350 B2 * | 9/2008 | Speer | B64C 13/24 |
| | | | 244/225 |
| 7,578,484 B2 | 8/2009 | Fox | |
| 7,866,608 B2 | 1/2011 | Atinault | |
| 9,180,962 B2 | 11/2015 | Moser et al. | |
| 2005/0274846 A1 * | 12/2005 | Dun | B64C 9/24 |
| | | | 244/55 |
| 2007/0069084 A1 | 3/2007 | Arata | |
| 2011/0101172 A1 * | 5/2011 | Dyckrup | B64C 9/02 |
| | | | 244/201 |
| 2011/0303796 A1 * | 12/2011 | Etling | B64C 9/00 |
| | | | 244/90 R |
| 2013/0264427 A1 | 10/2013 | Hetrick | |
| 2016/0318618 A1 | 11/2016 | Grip | |
| 2017/0314588 A1 | 11/2017 | Kota | |
| 2019/0185127 A1 * | 6/2019 | Van Bavel | B64D 27/14 |

\* cited by examiner

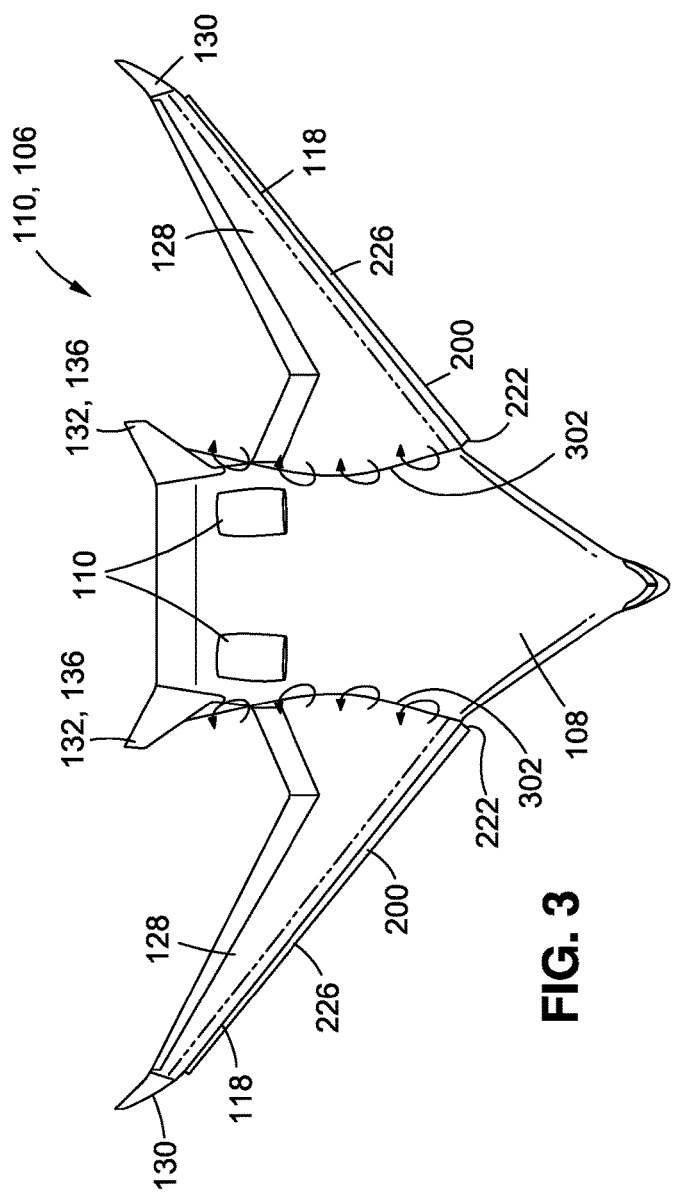
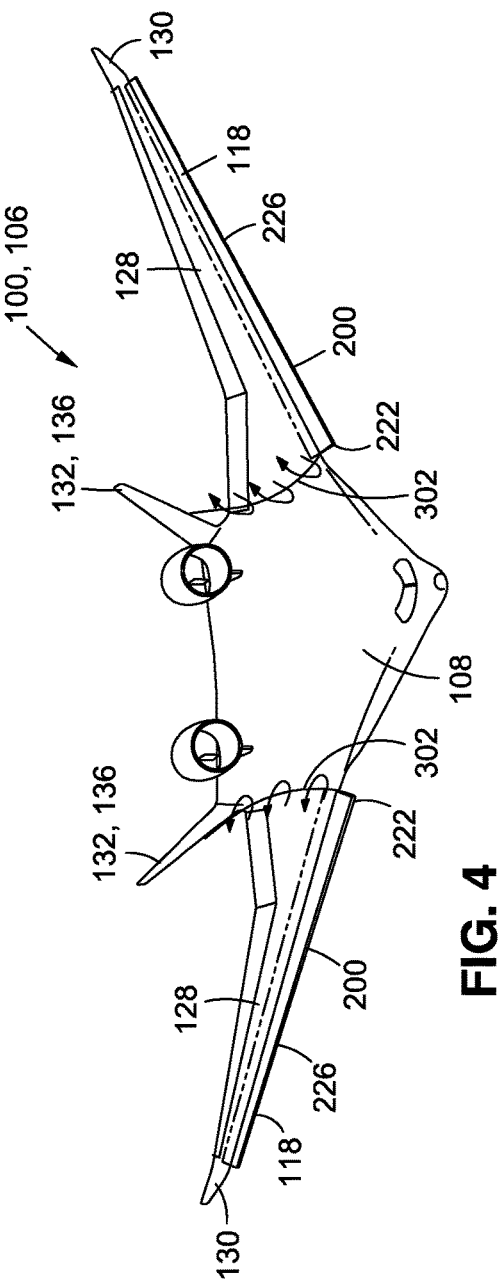

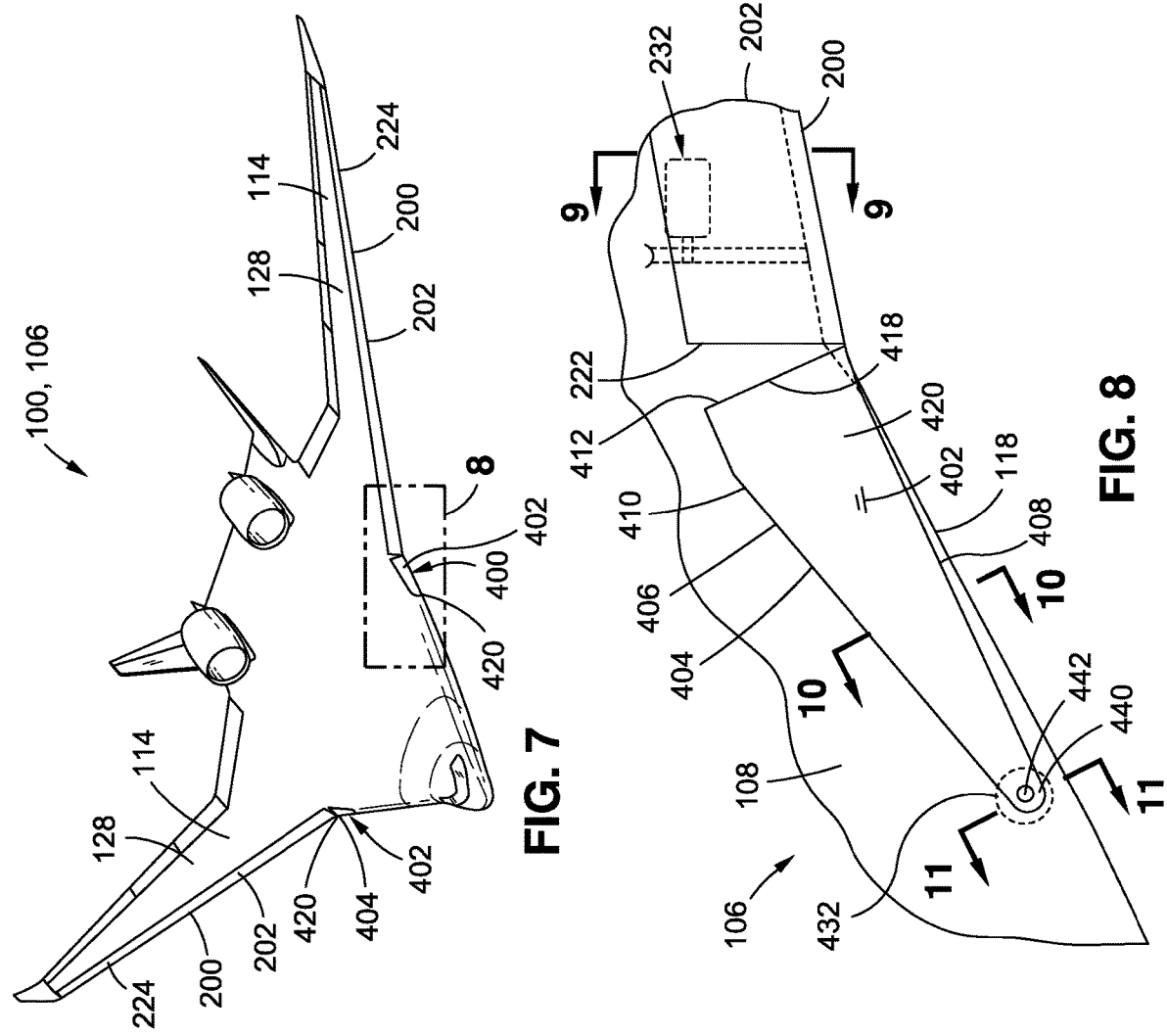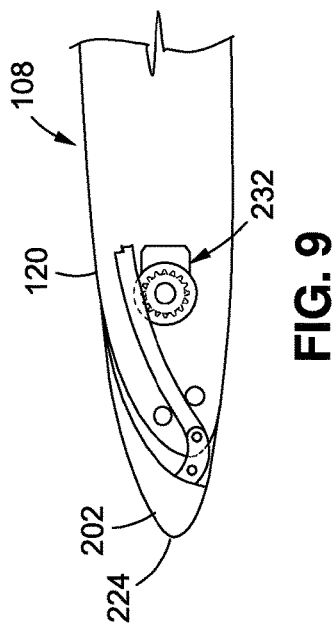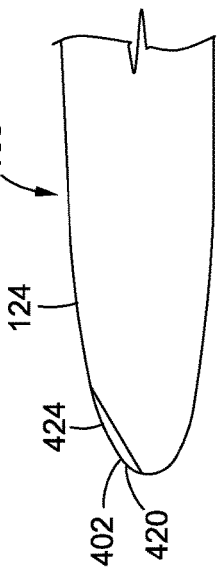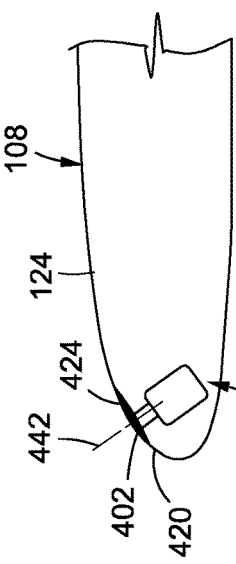

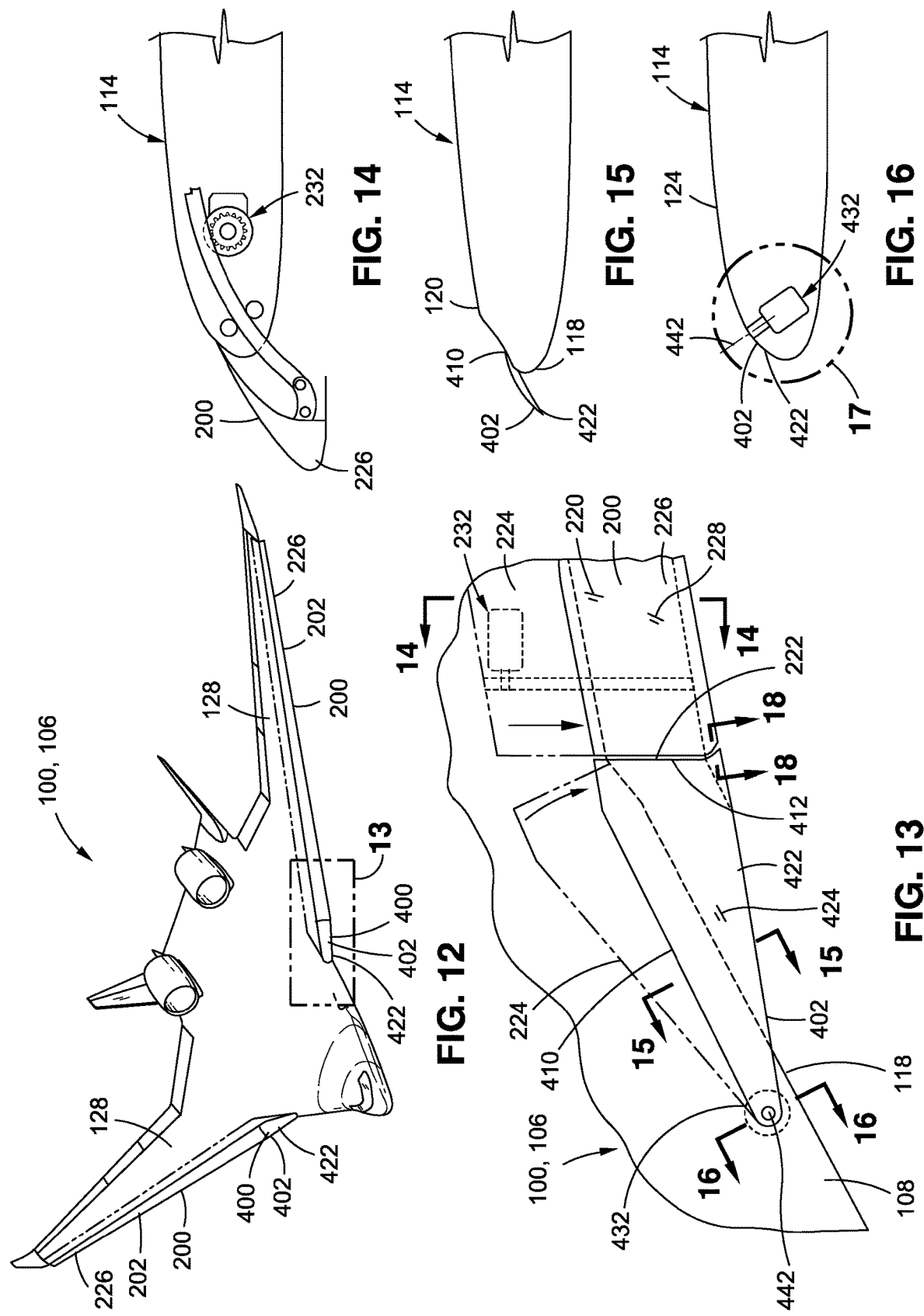

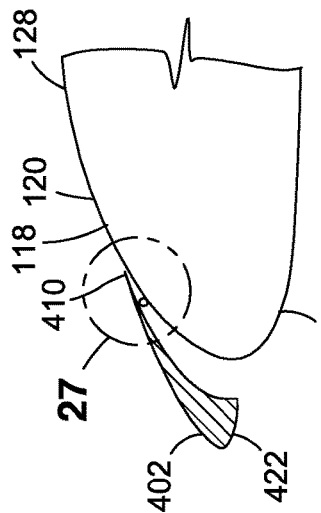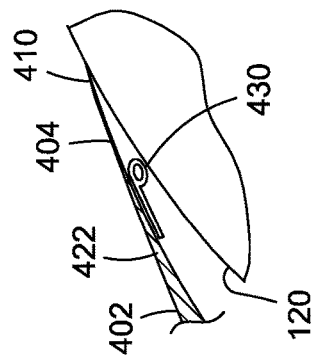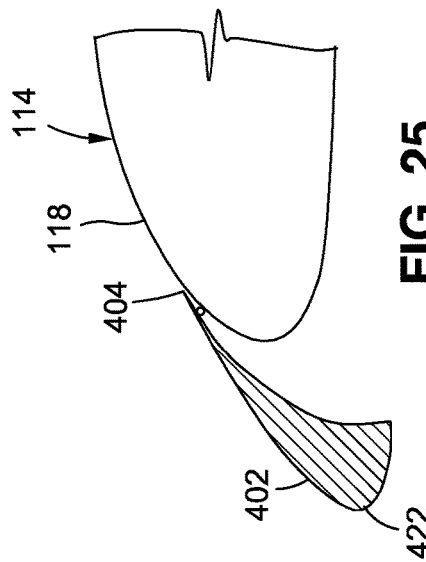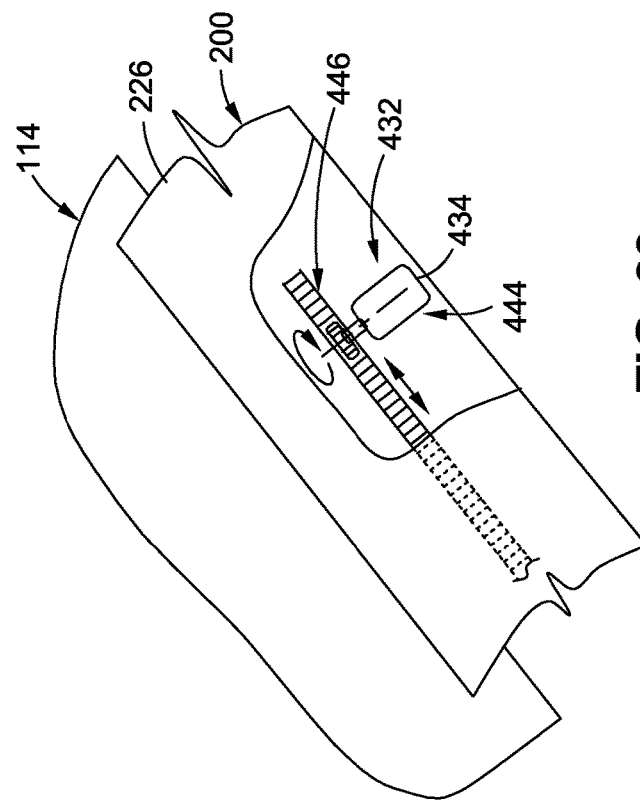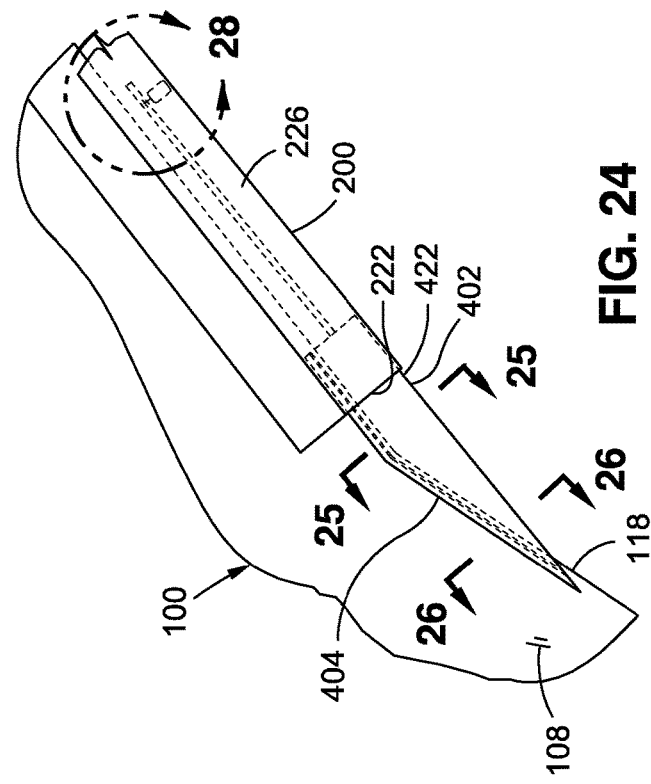

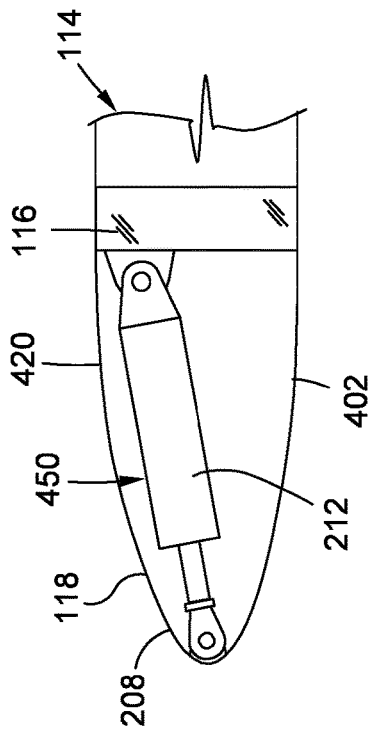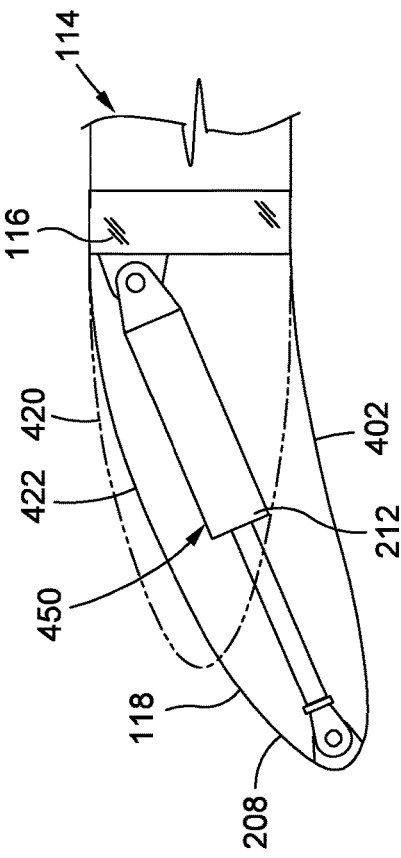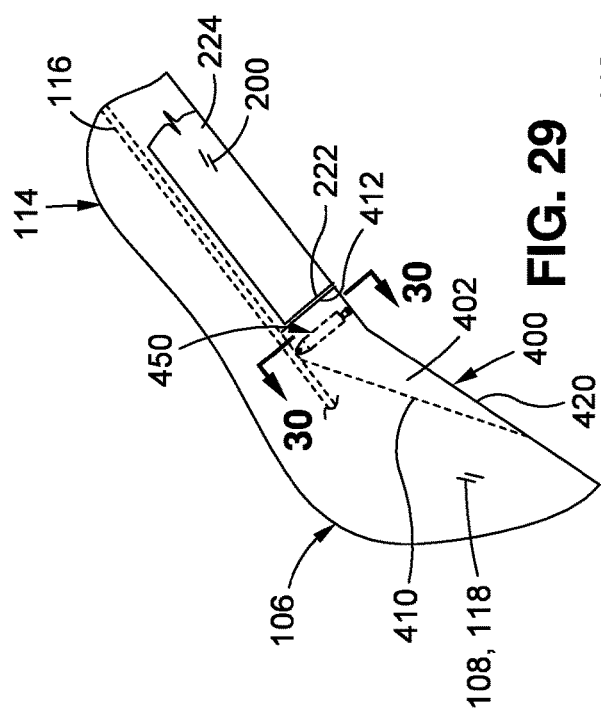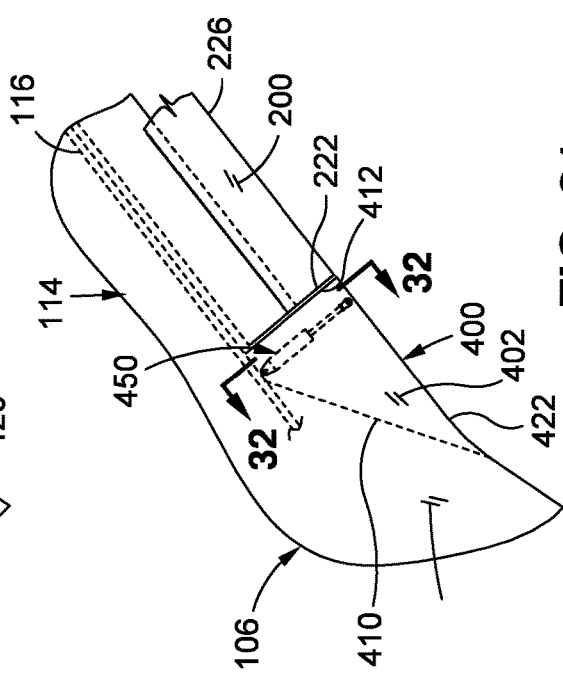

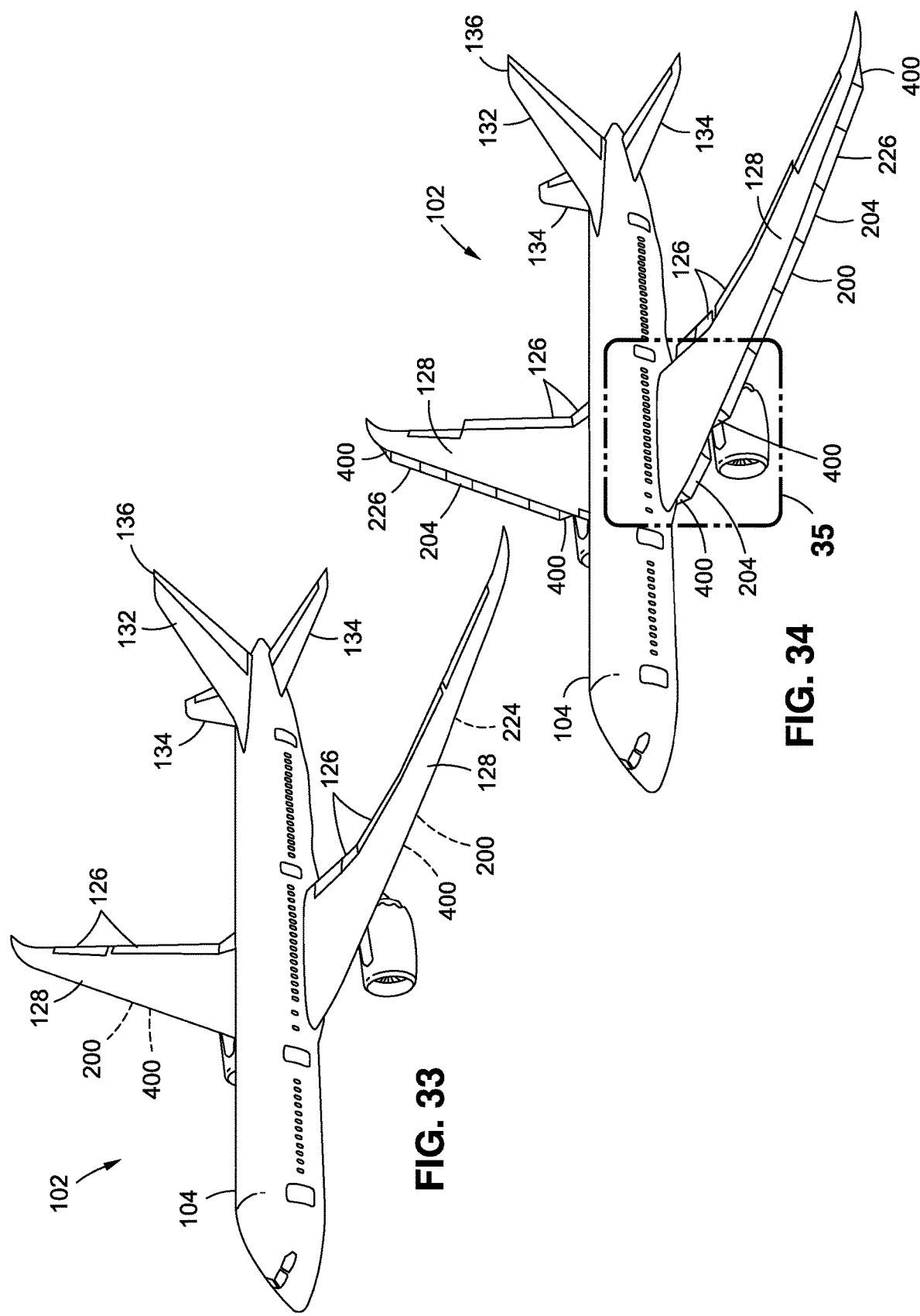

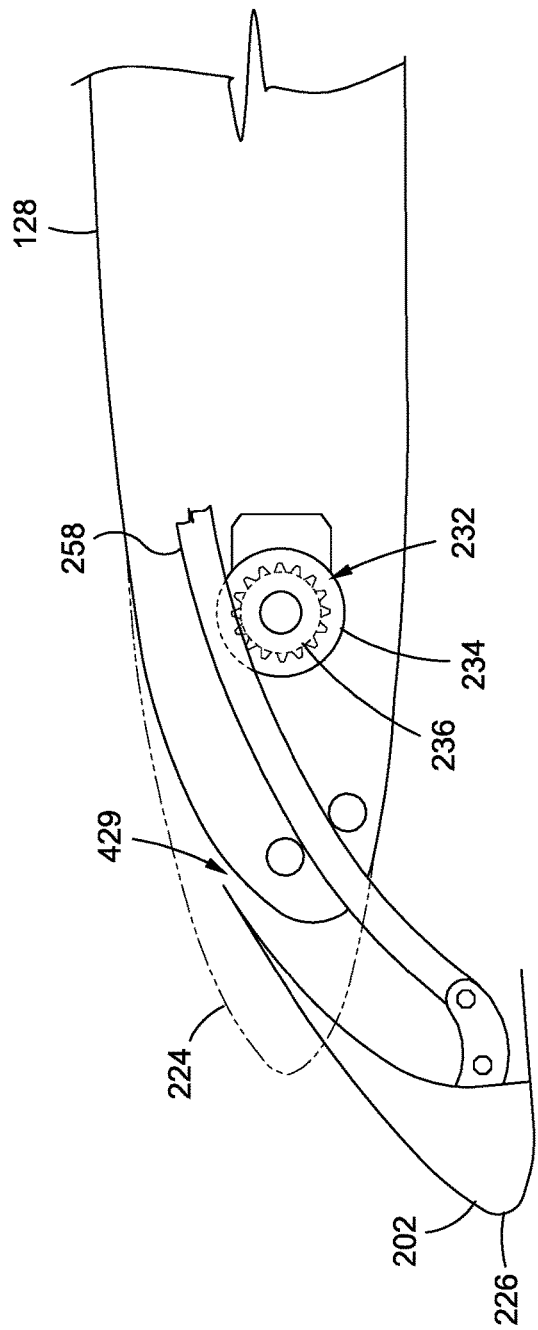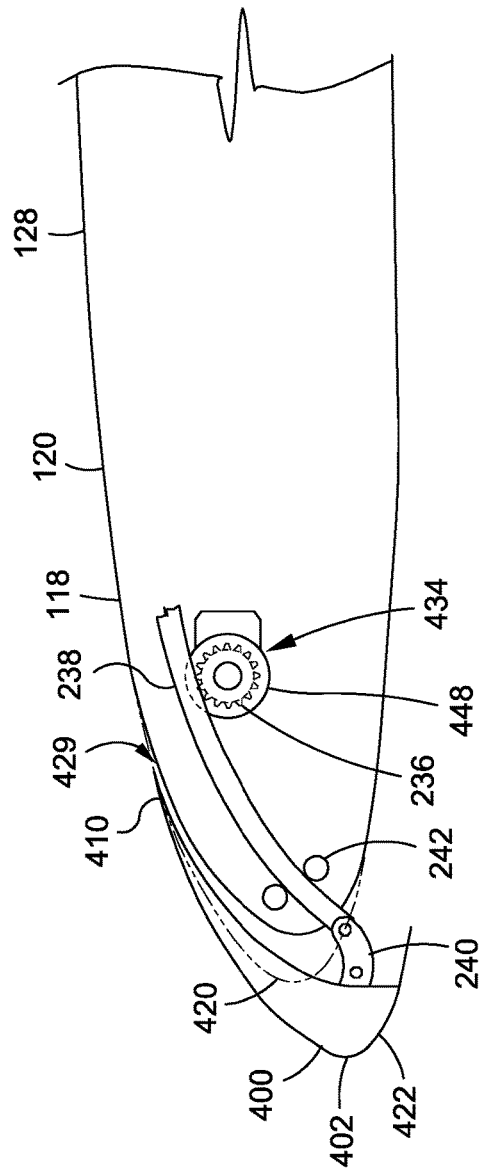
FIG. 42
FIG. 43

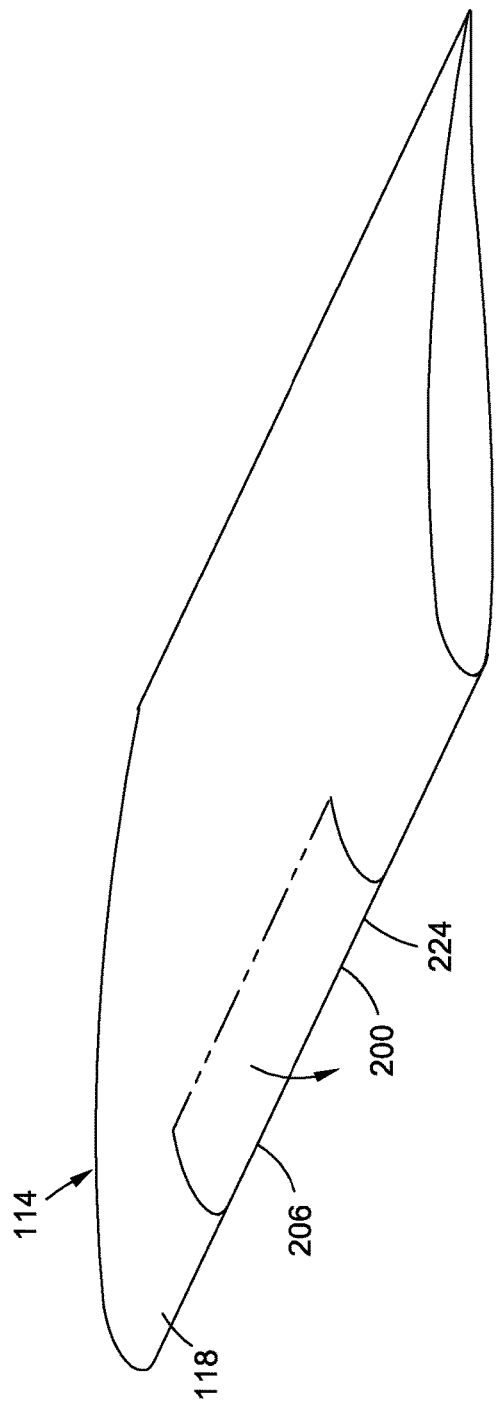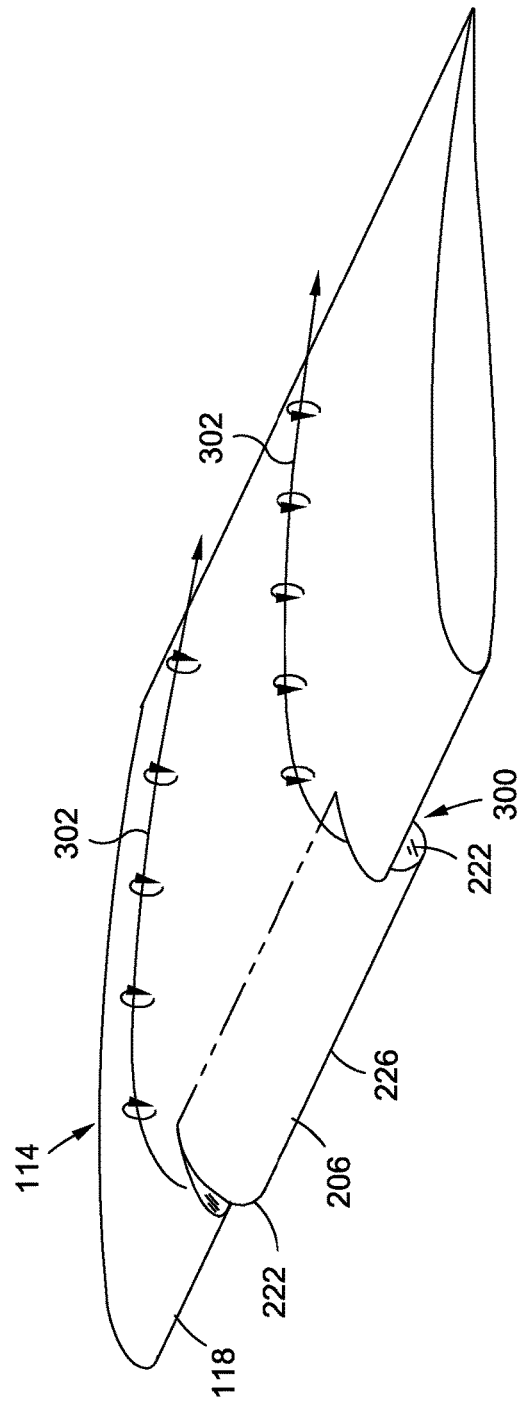

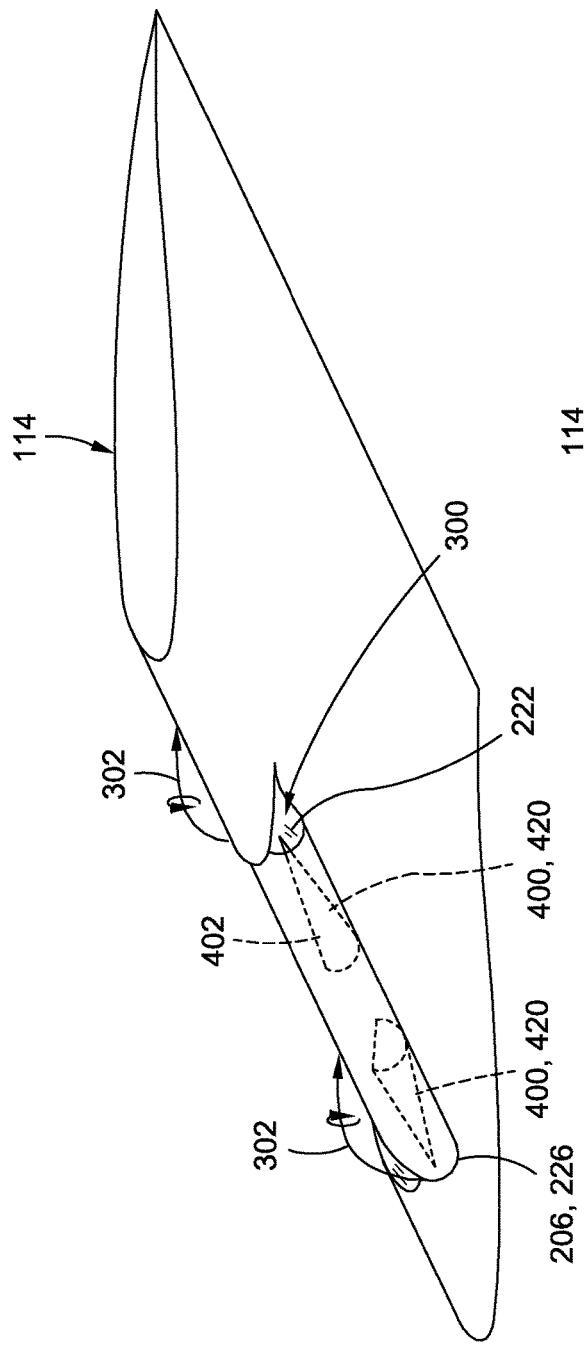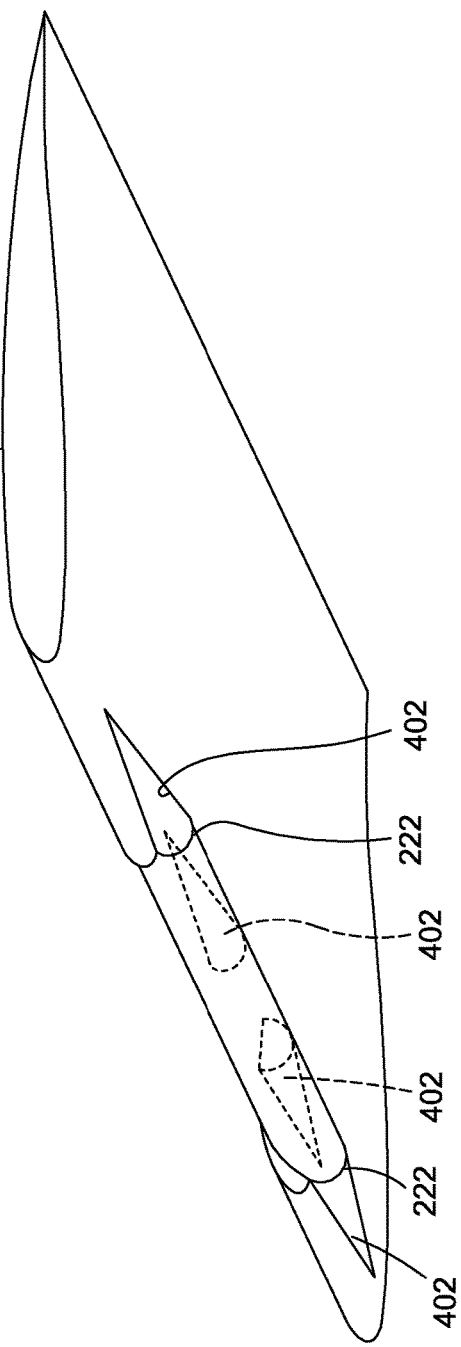

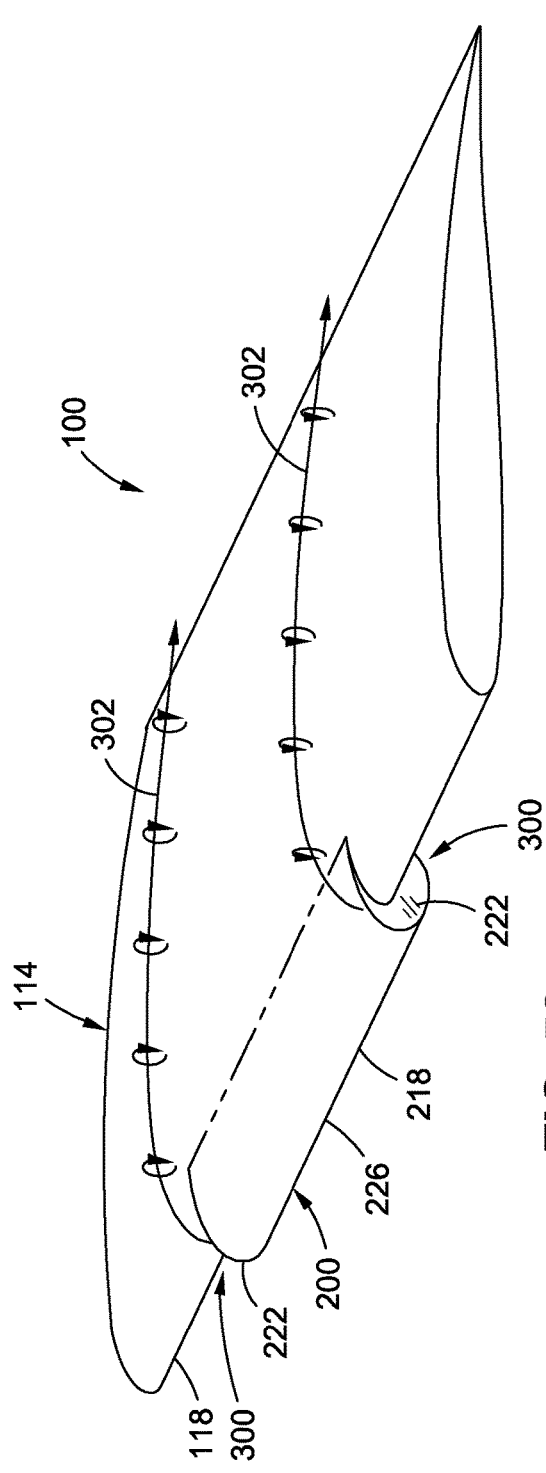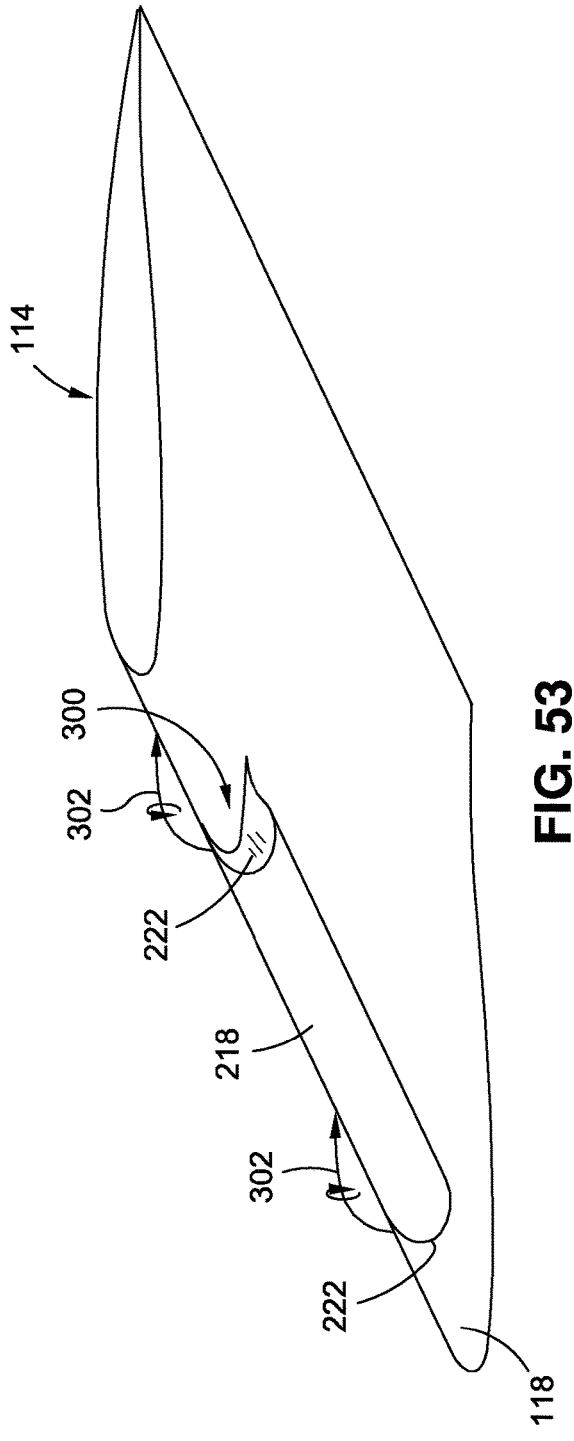

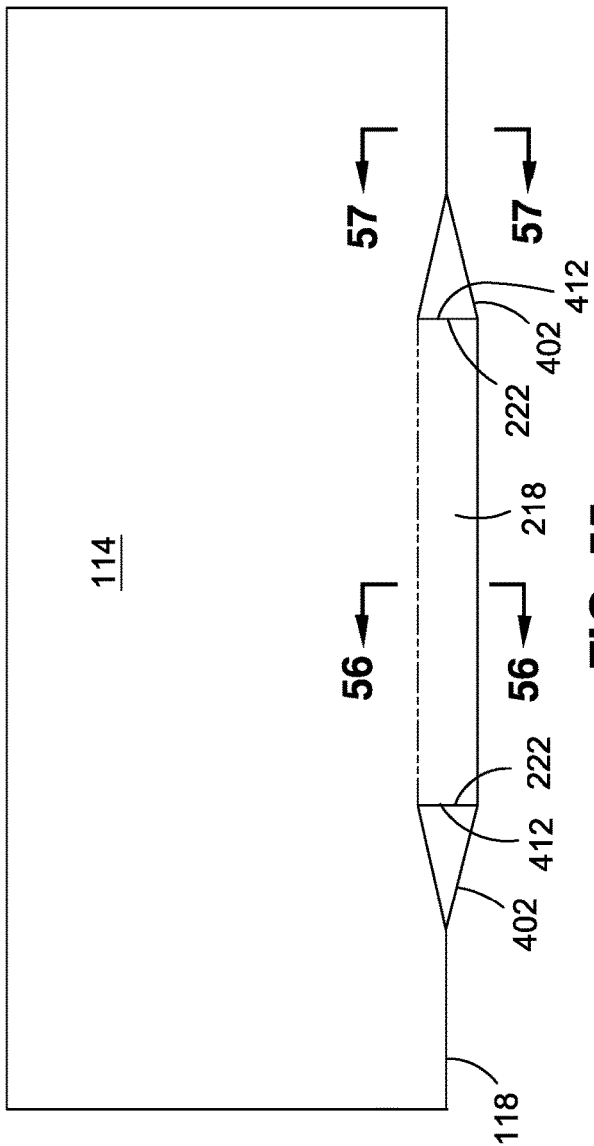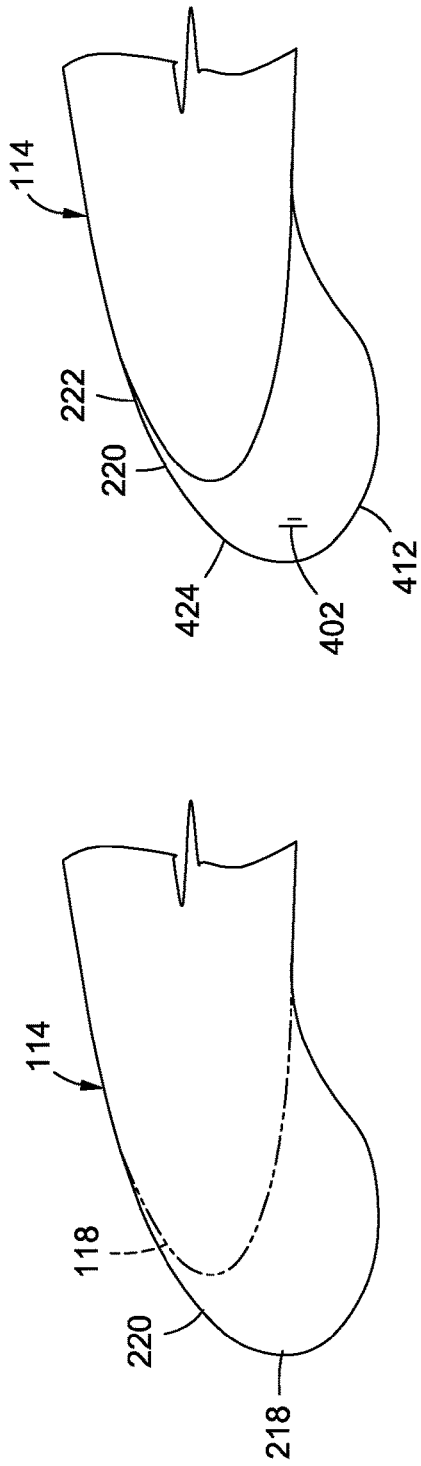

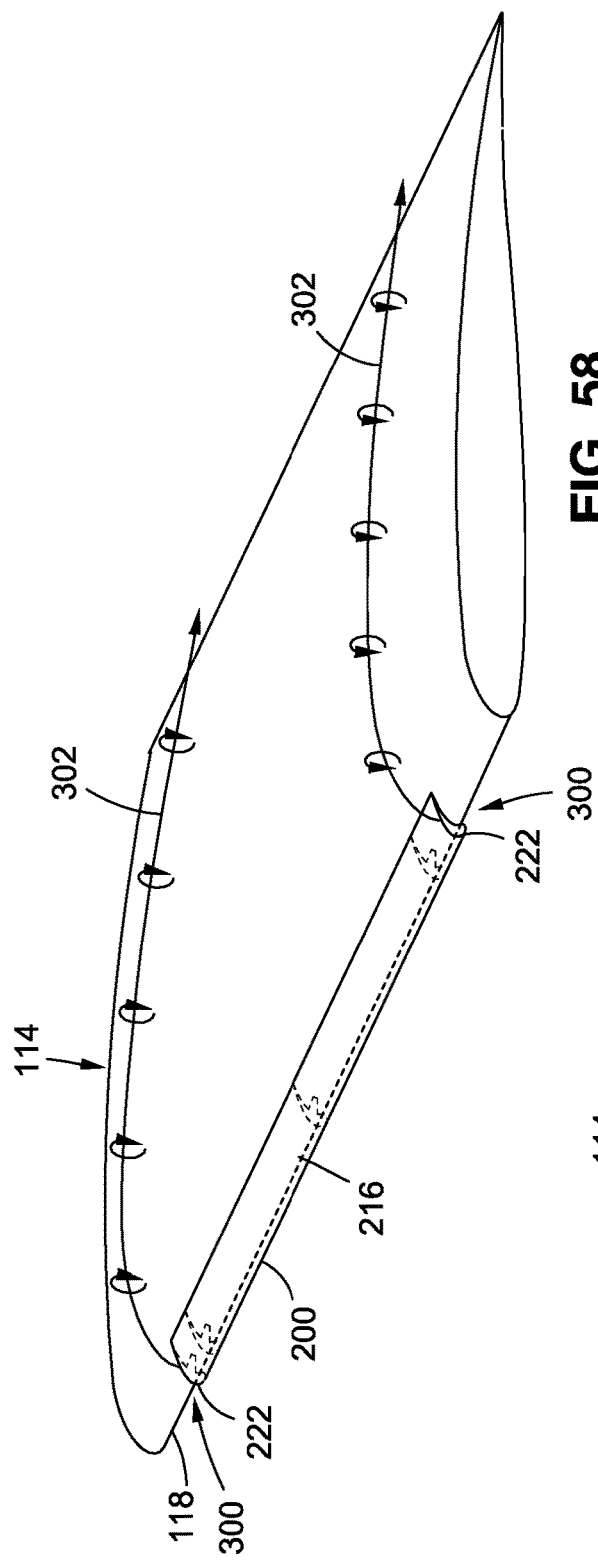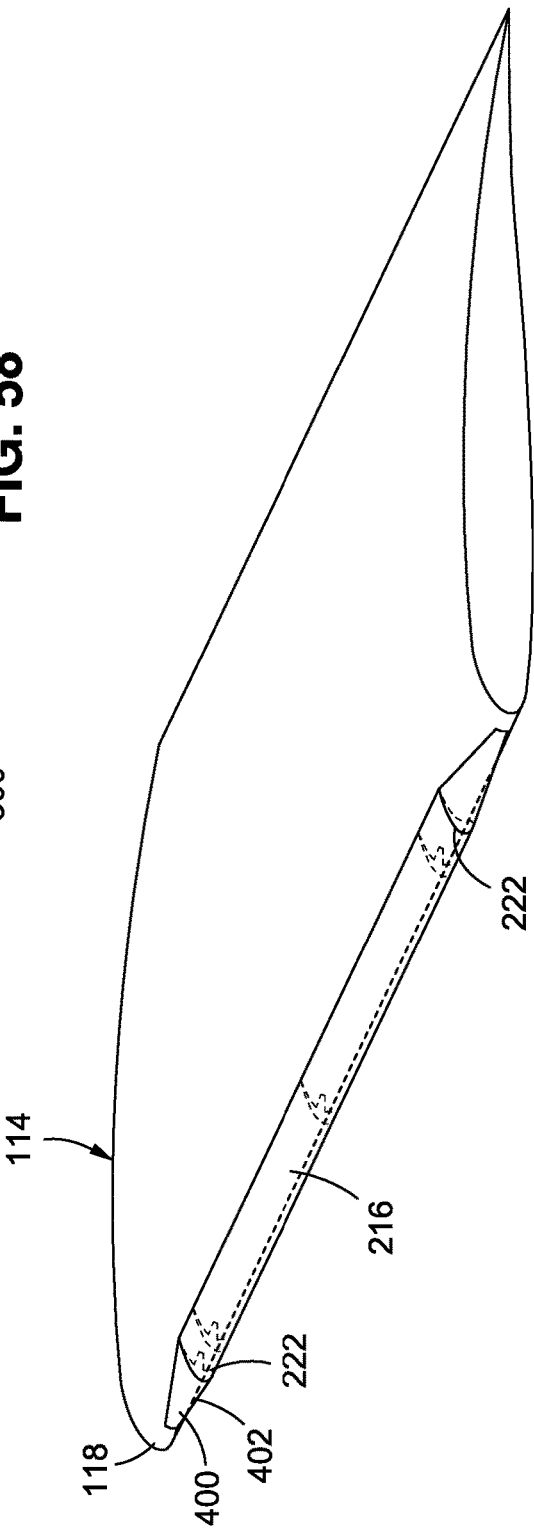

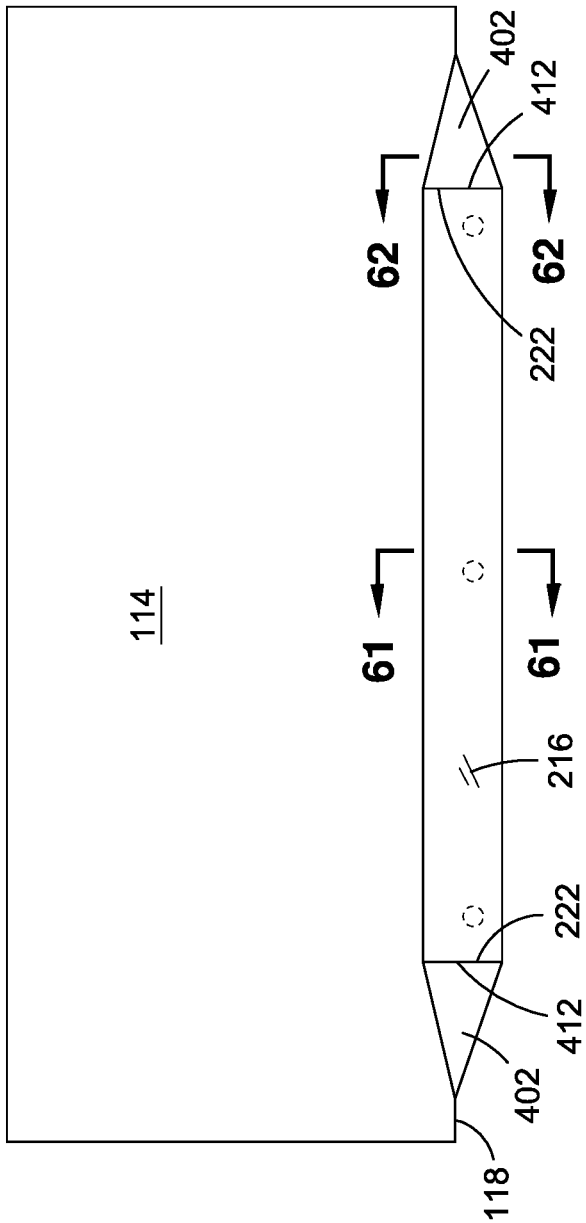
FIG. 60
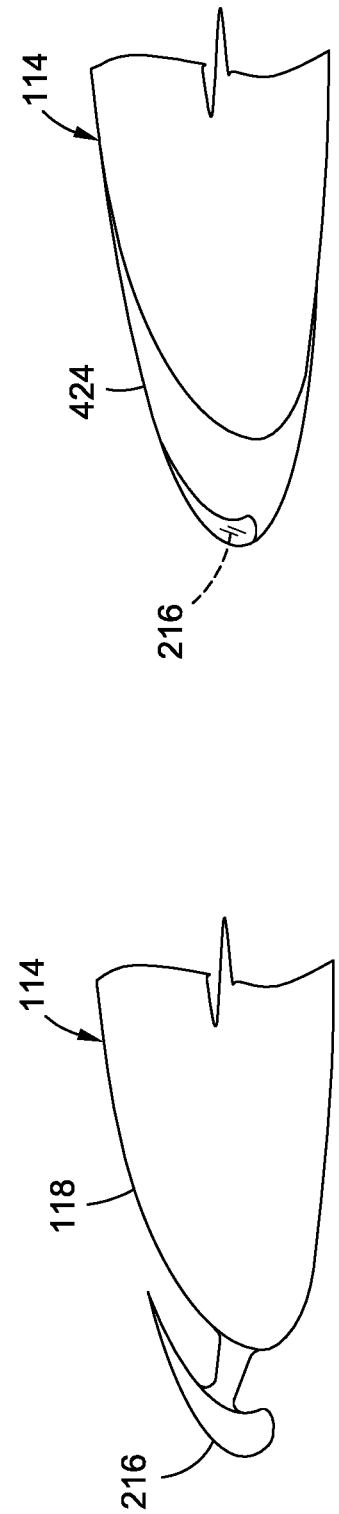
FIG. 62
FIG. 61

END SEAL DEVICE FOR A HIGH-LIFT DEVICE OF AN AIRCRAFT

FIELD

The present disclosure relates generally to aircraft configurations and, more particularly, to an end seal device for mitigating a vortex generated by a high-lift device of an aircraft.

BACKGROUND

Many aircraft include high-lift devices coupled to the wings for improving the aerodynamic performance of the aircraft. Such high-lift devices may be extended during certain phases of flight to alter the lift characteristics of the wings. For example, an aircraft may have leading edge slats or Krueger flaps that may be extended from the wing leading edge during takeoff, approach, and/or landing to increase the area and camber of the wings to thereby improve the wing lift characteristics.

When a high-lift device is in the extended position, one or both of the opposing device ends of the high-lift device may be exposed to oncoming airflow. The flow of air over a device end may result in the formation of a vortex that extends aftwardly over the wings. For an aircraft that has engines (e.g., turbine engines) located aft of the wings, such a vortex may affect the air entering the engine inlet. In addition, such a vortex may impinge on one or more tail surfaces which may be undesirable from a structural standpoint and/or from a stability and control standpoint. Furthermore, the airflow over the device ends may affect the maximum lift coefficient of the aircraft.

As can be seen, there exists a need in the art for a device and method for mitigating or preventing the occurrence of vortices that may be generated by high-lift devices in the extended position. The device and method also preferably enhance the maximum lift coefficient of the aircraft when the high-lift devices are in the extended position.

SUMMARY

The above-noted needs associated with high-lift devices are specifically addressed by the present disclosure which provides an end seal device for a high-lift device on an airfoil leading edge of an airfoil. The end seal device includes an end seal body configured to be coupled to the airfoil and having a seal body spanwise portion and a seal end. The end seal body is configured to be in a seal extended position when the high-lift device is in a device extended position. The seal body spanwise portion is disposed adjacent to the aircraft body or the airfoil leading edge and the seal end is disposed adjacent to a device end of the high-lift device when the end seal body is in the seal extended position and the high-lift device is in the device extended position. The end seal body in the seal extended position fills a discontinuity otherwise occurring between the device end and the aircraft body or airfoil leading edge if the end seal body were omitted.

Also disclosed is an aircraft having at least one airfoil having a high-lift device on an airfoil leading edge. The aircraft includes an end seal device having an end seal body configured to be coupled to the airfoil and having a seal body spanwise portion and a seal end. The end seal body is configured to be in a seal extended position when the high-lift device is in a device extended position. The seal body spanwise portion is disposed adjacent to the aircraft body or the airfoil leading edge and the seal end is disposed adjacent to a device end of the high-lift device when the end seal body is in the seal extended position and the high-lift device is in the device extended position. The end seal body in the seal extended position fills a discontinuity otherwise occurring between the device end and the aircraft body or airfoil leading edge if the end seal body were omitted.

In addition, disclosed is a method of improving the performance of an aircraft having a high-lift device coupled to an airfoil. The method includes passing an airflow over an end seal body located adjacent to a device end of the high-lift device in a device extended position. The end seal body is in a seal extended position and fills a discontinuity otherwise occurring between the device end and the aircraft body or airfoil leading edge if the end seal body were omitted. The method further includes mitigating, using the end seal device, a vortex otherwise generated by the airflow due to the discontinuity.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a top view of the blended wing body aircraft of FIG. 1 showing each one of the high-lift devices in the device extended position and further illustrating vortices impinging on the tail surfaces of the aircraft;

FIG. 4 is a perspective view of the blended wing body aircraft of FIG. 3 showing the vortices impinging on the tail surfaces;

FIG. 7 is a perspective view of a blended wing body having an end seal device including an end seal body coupled to the wing and shown in a seal retracted position and configured to be movable into a seal extended position for filling the discontinuity otherwise occurring between the device end and the wing leading edge if the end seal body were omitted;

FIG. 8 is a magnified view of a portion of the blended wing body aircraft of FIG. 7 and illustrating an example of the end seal body configured to be rotated about a seal pivot axis for moving the end seal body between the seal retracted position and the seal extended position;

FIG. 9 is a sectional view taken along line 9 of FIG. 8 and illustrating the high-lift device configured as a leading edge slat shown in the device retracted position;

FIG. 10 is a sectional view taken along line 10 of FIG. 8 and illustrating the end seal body generally conforming to the contour of the airfoil when the end seal body is in the seal retracted position;

FIG. 11 is a sectional view taken along line 11 of FIG. 8 and illustrating a seal actuation mechanism for rotating the end seal body between the seal retracted position and the seal extended position;

FIG. 12 is a perspective view of the blended wing body aircraft of FIG. 7 and showing the end seal body and the high-lift device respectively in the seal extended position and the device extended position;

FIG. 13 is a magnified view of a portion of the blended wing body aircraft of FIG. 8 and illustrating the end seal body rotated about the seal pivot axis into the seal extended position and further illustrating the high-lift device in the device extended position;

FIG. 14 is a sectional view taken along line 14 of FIG. 13 and illustrating the leading edge slat in the device extended position;

FIG. 15 is a sectional view taken along line 15 of FIG. 13 and illustrating the end seal body in the seal extended position;

FIG. 16 is a sectional view taken along line 16 of FIG. 13 and illustrating the end seal body at the pivot axis when the end seal body is in the seal extended position;

FIG. 24 is a magnified view of the portion of the blended wing body aircraft of FIG. 19 showing the high-lift device in the device extended position and the end seal body in the seal extended position and telescoping from the device end of the high-lift device;

FIG. 25 is a sectional view taken along line 25 of FIG. 24 and illustrating the end seal body in the seal extended position;

FIG. 26 is a sectional view taken along line 26 of FIG. 24 and illustrating the end seal body having a seal body trailing edge in contact with an airfoil upper surface of the wing of the blended wing body aircraft;

FIG. 27 is a magnified view of the seal body trailing edge having a gap sealing element extending along a seal body spanwise portion of the end seal body for preventing airflow between the seal body spanwise portion and the airfoil upper surface;

FIG. 28 is a magnified plan view of the high-lift device taken along line 28 of FIG. 24 and illustrating an example of a seal actuation system having a rack and pinion assembly for telescoping movement of the end seal body from the seal retracted position (FIGS. 20 and 22) to the seal extended position (FIG. 24);

FIG. 29 is a magnified view of a portion of a blended wing body aircraft showing an example of the end seal device in which a portion of the airfoil leading edge located laterally adjacent to the device end of the high-lift device (shown in the device retracted position) is configured to function as the end seal body and morph between the seal retracted position (FIGS. 29-30) and the seal extended position (FIGS. 31-32);

FIG. 30 is a sectional view taken along line 30 of FIG. 29 and illustrating an example of a morphing actuator configured as a push-pull actuator for actuating the end seal body (e.g., the laterally adjacent portion of the airfoil leading edge) between the seal retracted position and the seal extended position;

FIG. 31 is a magnified view of the portion of the blended wing body aircraft of FIG. 31 showing the high-lift device in the device extended position and illustrating the end seal after being morphed into the seal extended position;

FIG. 32 is a sectional view taken along line 32 of FIG. 31 and illustrating the end seal body after being morphed into the seal extended position;

FIG. 33 is a perspective view of an example of a tube-and-wing aircraft;

FIG. 34 is a perspective view of the tube-and-wing aircraft of FIG. 33 having a plurality of high-lift devices each in a device extended position;

FIG. 42 is a sectional view taken along line 42 of FIG. 41 and illustrating the high-lift device configured as a leading edge slat;

FIG. 43 is a sectional view taken along line 43 of FIG. 41 and illustrating the end seal device configured in a slat configuration similar to the leading edge slat of the high-lift device;

FIG. 44 is a top perspective view of an example of an airfoil in which a portion of the airfoil leading edge forms a high-lift device configured as a morphing leading edge and which is shown in a device retracted position;

FIG. 45 is a top perspective view of the airfoil of FIG. 44 showing the morphing leading edge in a device extended position and illustrating vortices emanating from the device ends of the morphing leading edge;

FIG. 46 is a bottom perspective view of the airfoil of FIGS. 42-43 and illustrating the morphing leading edge in a device extended position and further illustrating a pair of end seal devices each in a seal retracted position within the morphing leading edge;

FIG. 47 is a bottom perspective view of the airfoil of FIG. 46 showing the pair of end seal devices after telescoping outwardly from the device ends of the morphing leading edge into a seal extended position;

FIG. 52 is a top perspective view of an example of an airfoil in which a portion of the airfoil leading edge forms a high-lift device configured as a leading edge cuff which is permanently in a device extended position and further illustrating vortices emanating from the device ends of the leading edge cuff;

FIG. 53 is a bottom perspective view of the airfoil of FIG. 52 showing the leading edge cuff;

FIG. 55 is a plan view of the airfoil of FIG. 54 showing the end seal devices on each of opposing device ends of the leading edge cuff;

FIG. 56 is a sectional view taken along line 56 of FIG. 55 and illustrating the device outer mold line of the leading edge cuff;

FIG. 57 is a sectional view taken along line 57 of FIG. 55 and illustrating the seal outer mold line of the end seal body substantially matching the device outer mold line of the leading edge cuff;

FIG. 58 is a top perspective view of an example of an airfoil having a high-lift device configured as a fixed slot mounted on the airfoil leading edge and further illustrating vortices emanating from the device ends of the fixed slot;

FIG. 59 is a top view of the airfoil of FIG. 58 having an end seal device on each of opposing device ends of the fixed slot;

FIG. 60 is a plan view of the airfoil of FIGS. 58-59 showing the end seal devices on each of opposing device ends of the fixed slot;

FIG. 61 is a sectional view taken along line 64 of FIG. 60 illustrating the fixed slot mounted on the airfoil leading edge;

FIG. 62 is a sectional view taken along line 62 of FIG. 60 and illustrating the seal outer mold line of the end seal body substantially matching the device outer mold line of the fixed slot;

DETAILED DESCRIPTION

Figure 1:
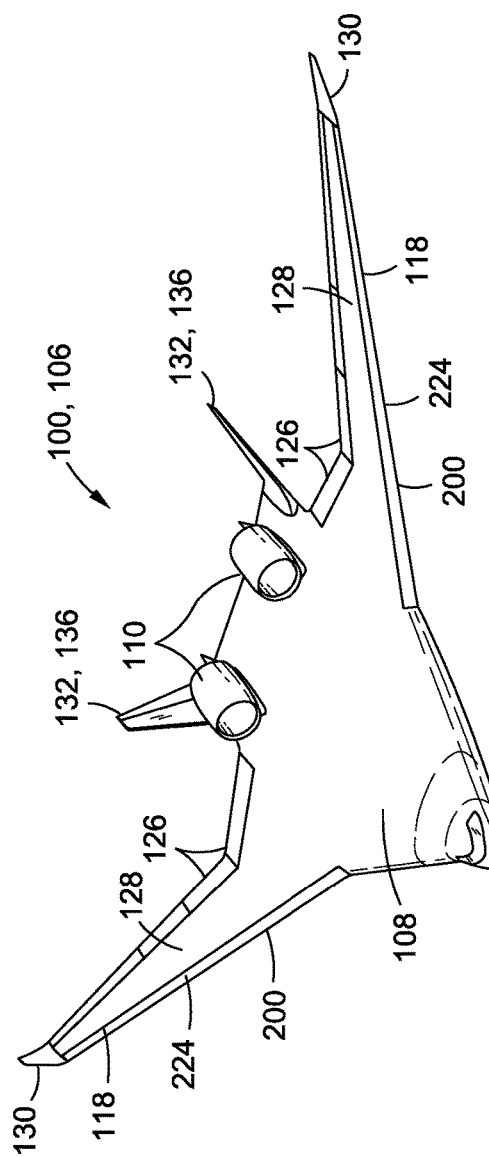
FIG. 1 is a perspective view of an example of a blended wing body aircraft having high-lift devices which are each shown in a device retracted position on the leading edges of the wings.

Referring now to the drawings wherein the showings are for purposes of illustrating preferred and various embodiments of the disclosure, shown in FIG. 1 is a perspective view of an example of a blended wing body aircraft 106 having an aircraft body 108 and a pair of wings 128. The wings 128 may include one or more trailing edge devices 126 such as trailing edge flaps and ailerons. In addition, the wings 128 may each include a wing tip device 130 such as a winglet (not shown). The blended wing body aircraft 106 may further include one or more tail surfaces 132 such as vertical tail surfaces or outwardly-canted tail surfaces. In addition, the blended wing body aircraft 106 may include propulsion units such as a pair of turbine engines 110 located above the aircraft body 108 at the aft end of the aircraft 100. Each one of the wings 128 includes one or more high-lift devices 200 which are shown in a device retracted position 224 on the airfoil leading edge 118 of the wings 128. The high-lift devices 200 may be movable between a device retracted position 224 and a device extended position 226.

Figure 2:
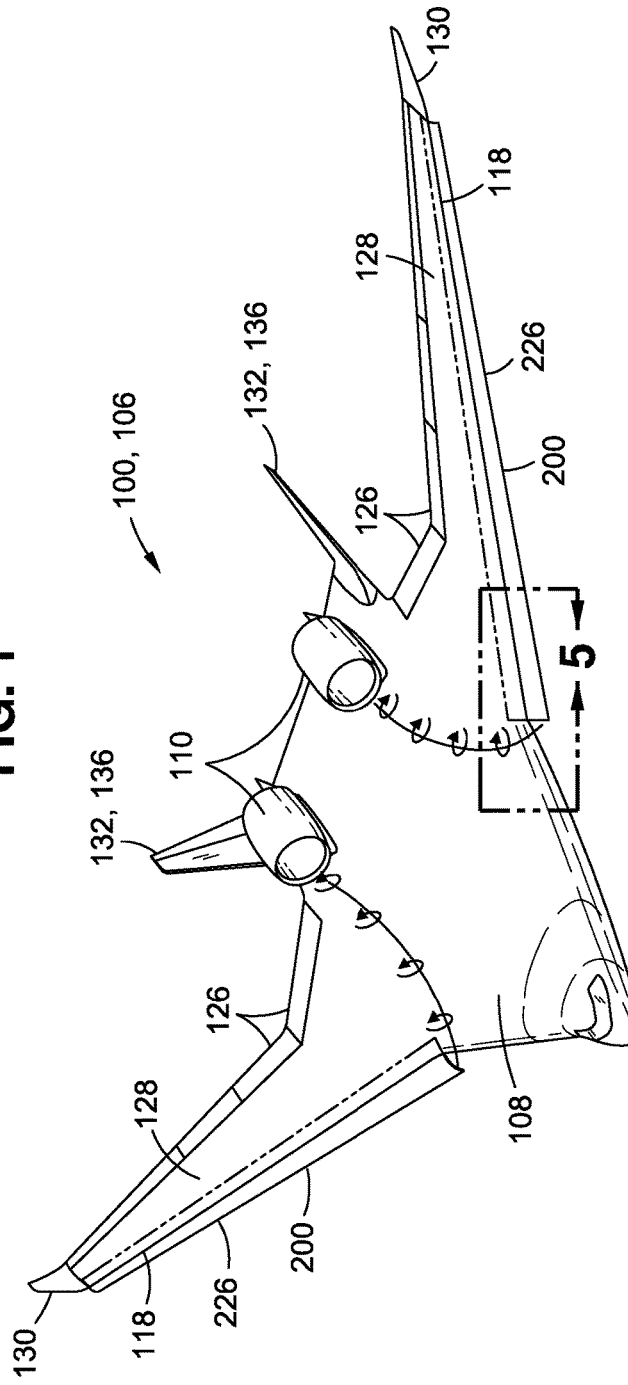
FIG. 2 is a perspective view of the blended wing body aircraft of FIG. 1 showing each one of the high-lift devices in a device extended position and further illustrating vortices emanating from the device ends of the high-lift devices.

Referring to FIG. 2, shown is the blended wing body aircraft 106 in a configuration in which each one of the high-lift devices 200 has been moved from the device retracted position 224 (FIG. 1) to the device extended position 226. Also shown are vortices 302 emanating from the device end 222 of the respective high-lift devices 200 in the device retracted position. Each vortex is generated as a result of a discontinuity 300 between the device end 222 and the laterally-adjacent portion of the airfoil leading edge 118 and/or aircraft body 108. For the flight condition of the aircraft in FIG. 2, the vortices 302 extend afterwardly from the device end 222 along a path that may result in the vortices 302 distorting the airflow into the engine inlet 112 of the turbine engines 110.

FIGS. 3-4 illustrates the aircraft 100 in a flight condition that results in the vortices 302 extending along a path that impinges on the tail surfaces (e.g., vertical tails 136) of the aircraft 100 and which may be undesirable from a structural standpoint. For example, the tail surfaces may be required to handle increased aerodynamic loads due to impingement by the vortices 302, and resulting in a weight penalty due to an increase in the structural mass of the tail surfaces. The vortices 302 may also be undesirable from a stability and control standpoint. For example, vortices 302 impinging on the vertical tails 136 and corresponding rudders (not shown) may affect yaw control capability (e.g., rudder authority) of the aircraft 100 in a region of the design envelope where yaw control power may be reduced. Designing the aircraft 100 such that the vertical tails 136 are at a location that avoids the vortices 302 may not be feasible for weight and/or aerodynamic reasons. Reducing the span of the high-lift devices 200 as a means to reposition the device ends 222 and corresponding vortices 302 to a more outboard location may also not be feasible due to the undesirable reduction in maximum lift coefficient that may result from a reduction in the span of the high-lift devices 200.

Figure 5:
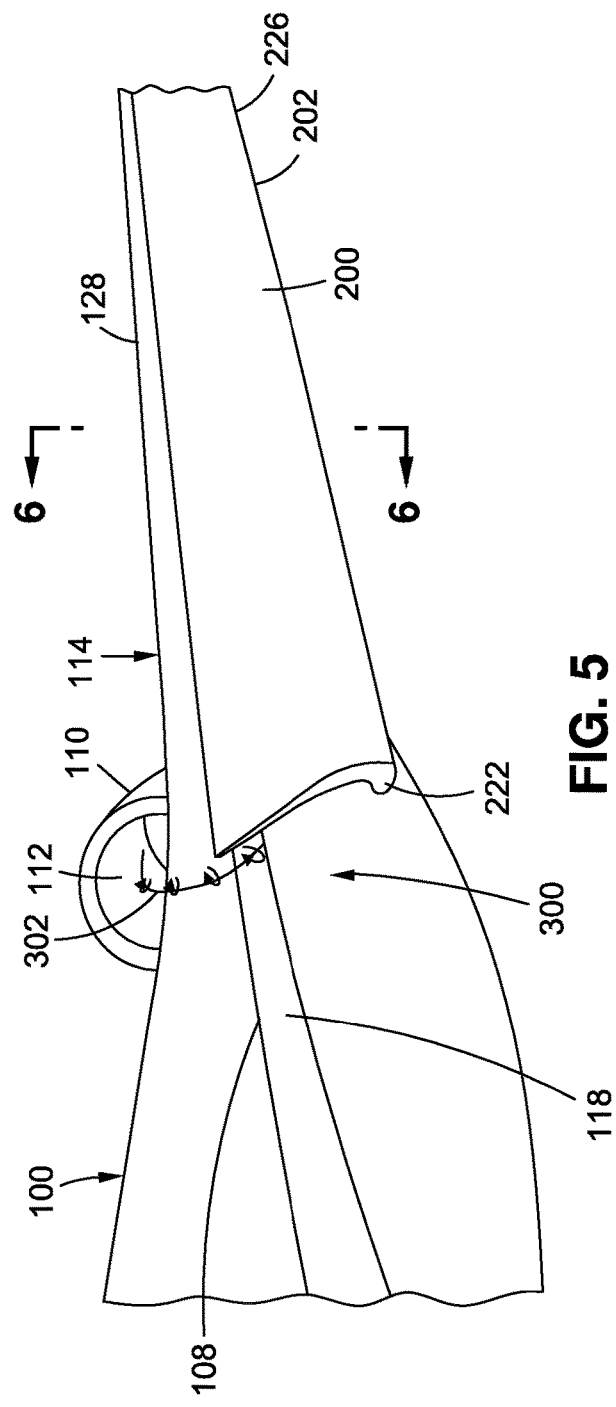
FIG. 5 is a magnified view of a portion of the blended wing body aircraft of FIG. 2 showing the device end of a high-lift device in the device extended position and further illustrating a vortex emanating from the device end due to a discontinuity occurring between the leading edge of the wing and the high-lift device in the device extended position.

FIG. 5 is a magnified view of the inboard end of a high-lift device 200 of FIGS. 1-4 configured as a leading edge slat 202 and shown in the device extended position 226. Also shown in FIG. 5 is a discontinuity 300 that is formed between the device end 222 of the leading edge slat 202 and the laterally-adjacent portion of the airfoil leading edge 118 and/or aircraft body 108 of the aircraft 100 when the leading edge slat 202 is in the device extended position 226. The discontinuity 300 may be a step-like notch formed between the device end 222 and the laterally-adjacent portion of the airfoil leading edge 118 and/or aircraft body 108. At the discontinuity 300, the device end 222 may be exposed to oncoming airflow and which may result in the formation of a vortex 302 emanating from the device end 222. As mentioned above, the vortex 302 may extend aftwardly over the airfoil 114 and may distort airflow at other locations on or near the aircraft 100. For example, during certain combinations of flight conditions such as at certain angles of attack and/or during a sideslip of the aircraft 100, a vortex 302 may disrupt or distort the airflow into an engine inlet 112 of a turbine engine 110 as shown in FIG. 2, or the vortex 302 may impinge on a tail surface 132 as shown in FIGS. 3-4 and described above. In addition, the discontinuity 300 between the device end 222 and the airfoil leading edge 118 or aircraft body 108 may reduce the maximum lift coefficient of the aircraft 100 which may affect the takeoff speed and/or landing speed of the aircraft 100.

Figure 6:
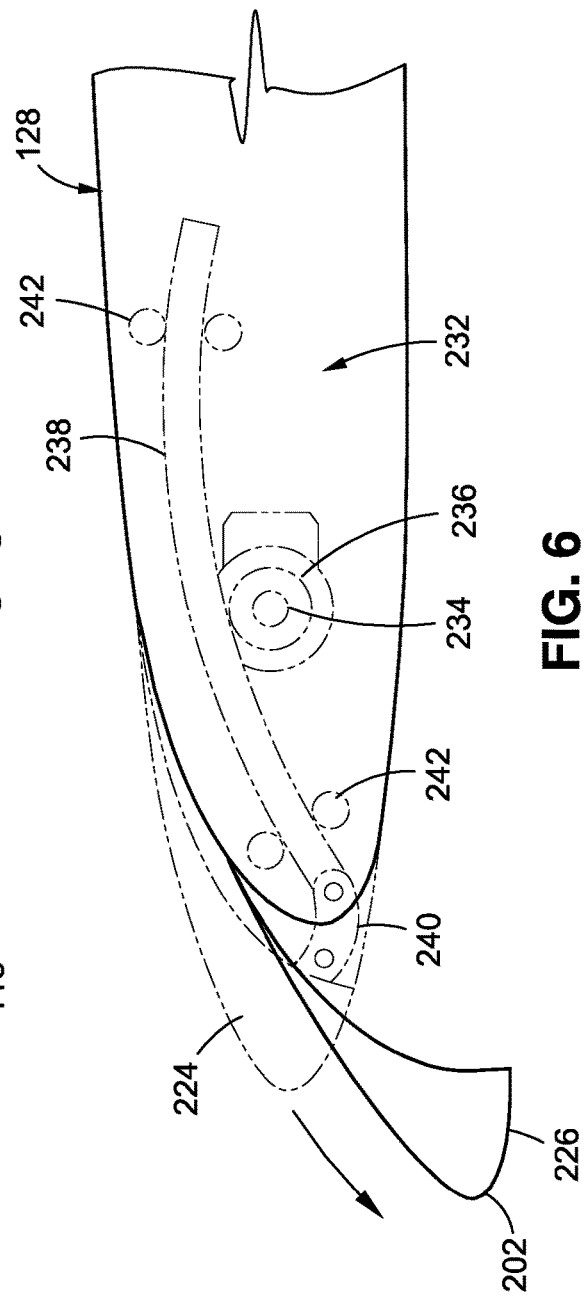
FIG. 6 is a sectional view taken along line 6 of FIG. 5 and illustrating the high-lift device configured as a leading edge slat shown in the device extended position.

FIG. 6 is a sectional view of the wing 128 illustrating the leading edge slat 202 in the device extended position 226 and showing an example of a device actuation system 232 of the leading edge slat 202. The device actuation system 232 may include one or more arcuate guide tracks 238. Each guide track 238 may be supported by one or more guide rollers 242 mounted to the airfoil leading edge 118. Each guide track 238 may include a track forward end 240 coupled to the leading edge slat 202. The device actuator 234 may be configured as a torque tube (not shown) or an electric motor (not shown) having a pinion gear 236 for engaging teeth (not shown) of the guide track 238 such that rotation of the pinion gear 236 causes movement of the guide track 238 which, in turn, causes movement of leading edge slat 202 between the device retracted position 224 and the device extended position 226.

FIG. 7 shows an example of a blended wing body aircraft 106 having a presently-disclosed end seal device 400 installed on each one of the wings 128 on the inboard sides of the leading edge slats 202. In the present disclosure, each end seal device 400 includes an end seal body 402 that is couplable to an airfoil 114 such as the wing 128 of a blended wing body aircraft 106. The end seal body 402 is configured to be in a seal retracted position 420 when the high-lift device 200 is in the device retracted position 224, and configured to be in the seal extended position 422 (FIG. 13) when the high-lift device 200 is in the device extended position 226 (FIG. 13). For example, the end seal device 400 may include a seal actuator 434 (FIG. 11) configured to transition the end seal body 402 between the seal retracted position 420 and the seal extended position 422. In some examples, the end seal body 402 may be transitioned between the seal retracted position 420 and the seal extended position 422 independent of the transition of the high-lift device 200 between the device retracted position 224 and the device extended position 226. In this regard, the end seal device 400 may be provided in a configuration in which the end seal body 402 is configured to be non-coupled to the high-lift device 200 such that the end seal body 402 moves independently of the high-lift device 200.

FIG. 8 is a magnified view of a portion of the blended wing body aircraft 106 showing an example of an end seal body 402 in an embodiment configured to be rotated about a seal pivot axis 442 at a pivot end 440 of the end seal body 402. As described in greater detail below, the end seal body 402 may be rotated about the seal pivot axis 442 for moving the end seal body 402 between the seal retracted position 420 and a seal extended position 422 (FIG. 13) for filling the discontinuity 300 (FIG. 5) otherwise occurring between the device end 222 and the laterally-adjacent portion of the airfoil leading edge 118 and/or aircraft body 108 of the aircraft 100. Advantageously, in any one of the end seal device 400 embodiments disclosed herein, the end seal body 402 may fill the discontinuity 300 and thereby forms a smooth, non-abrupt transition between the device end 222 and the portion of the airfoil leading edge 118 and/or aircraft body 108 located laterally adjacent to the device end 222.

As mentioned above, the end seal device 400 may mitigate or prevent the disruption of the airflow that may otherwise occur due to the discontinuity 300. In this regard, the end seal body 402 may mitigate or prevent the formation of a vortex 302 (FIGS. 2 and 5) that may otherwise be generated due to exposure of the device end 222 to oncoming airflow. Mitigation or prevention of the vortices 302 may reduce or avoid impingement of such vortices 302 on one or more tail surfaces 132 (e.g., vertical tails 136) of an aircraft 100 (e.g., FIGS. 3-4) which may reduce or avoid undesirable buffeting on the tail surfaces 132. The end seal body 402 may optionally be configured to increase the maximum lift coefficient of the aircraft 100 relative to the maximum lift coefficient of the same aircraft without end seal devices. In one embodiment, the end seal body 402 may be provided with a non-lifting shape. For a new aircraft design, the end seal devices 400 may be designed to mitigate or prevent the formation of vortices 302 that may otherwise affect the engines (e.g., turbine engines 110), the tail surfaces 132 (e.g., vertical tails 136), and which may also enhance the maximum lift coefficient of the aircraft 100.

In FIG. 8, the end seal body 402 has a seal body spanwise portion 404 which defines a seal length 406 of the end seal body 402. The end seal body 402 also has a seal body leading edge 408 and a seal body trailing edge 410. In addition, the end seal body 402 has a seal end 412 configured to be disposed adjacent to the device end 222 of a high-lift device 200 at least when the end seal body 402 and the high-lift device 200 are respectively in the seal extended position 422 (FIG. 13) and the device extended position 226 (FIG. 13). The end seal body 402 has a seal width 418 that be measured along a direction locally perpendicular to the seal body leading edge 408. In the example shown, the end seal body 402 may have the shape of an elongated triangle in which the seal width 418 generally tapers from the seal end 412 of the end seal body 402 to the pivot end 440 of the end seal body 402.

In any one of the end seal device examples disclosed herein, the end seal body 402 may have an aspect ratio of seal length 406 to seal width 418 of no less than 1. For example, the end seal body 402 may have an aspect ratio of at least 2. Providing the end seal body 402 at an aspect ratio of no less than 1 may result in a relatively smooth or non-abrupt transition in the spanwise profile of the airfoil 114 when the high-lift device 200 is in the extended position. However, in some examples, the end seal body 402 may have an aspect ratio of less than 1, and which may be capable of mitigating or preventing the formation of vortices 302 that may otherwise emanate from the device end 222 of a high-lift device 200.

FIG. 9 shows the leading edge slat 202 in a device retracted position 224. As mentioned above, the leading edge slat 202 may be moved to the device extended position 226 (FIG. 14) by means of a device actuation system 232. The device actuation system 232 may move the leading edge slat 202 forwardly and downwardly along the airfoil upper surface 120 from the device retracted position 224 to the device extended position 226. However, the leading edge slat 202 may be actuated by any one a variety of means for movement between the device retracted position 224 and the device extended position 226 (FIG. 14). The high-lift device 200 is not limited to being configured as a leading edge slat 202, and may be provided in other configurations described below such as a Krueger flap 204 (FIGS. 34-35), a morphing leading edge 206 (FIGS. 40-47), or other device configurations.

FIG. 10 shows a cross-section of the end seal body 402 in the seal retracted position 420 at a location generally midway between the seal end 412 (FIG. 8) and the pivot end 440 FIG. 8) of the end seal body 402. FIG. 11 shows a cross-section of the end seal body 402 at the seal pivot axis 442 and illustrating an example of a seal actuation system 432 for rotatably moving the end seal body 402 between the seal retracted position 420 and the seal extended position 422, as described in greater detail below. At any location along the seal length 406, the end seal body 402 may have a seal outer mold line 424 having a contour that is complementary to (e.g., substantially matches) and/or which generally conforms to the contour of the airfoil outer mold line 124 when the end seal body 402 is in the seal retracted position 420.

Referring to FIG. 12, shown is the blended wing body aircraft 106 and the end seal body 402 on each wing 128 moved to the seal extended position 422 and also showing the high-lift devices 200 (e.g., leading edge slats 202) in the device extended position 226. Although the aircraft 100 includes end seal devices 400 only on the inboard side of each high-lift device 200, an aircraft 100 may include end seal devices 400 on both the inboard side and the outboard side of one or more high-lift devices 200. In a still further embodiment not shown, an aircraft 100 may include end seal devices 400 only on the outboard side of one or more high-lift devices 200 of the aircraft 100.

FIG. 13 is a magnified view of a portion of the blended wing body aircraft 106 showing the high-lift device 200 (e.g., leading edge slat) in the device extended position 226 after being moved from the device retracted position 224 shown in phantom lines. The end seal body 402 is shown rotated about the seal pivot axis 442 into the seal extended position 422. The seal end 412 is shown disposed adjacent to the device end 222 of the high-lift device 200. In some examples, the seal end 412 may be configured to be in abutting and/or contacting relation to the device end 222 when the end seal body 402 is in the seal extended position 422 and the high-lift device 200 is in the device extended position 226. The end seal body 402 extends between the device end 222 and the portion of the airfoil leading edge 118 laterally adjacent to the device end 222 and thereby fills a discontinuity 300 (FIG. 3) that would otherwise occur between the device end 222 and the laterally adjacent portion of the airfoil leading edge 118 and/or aircraft body 108 (e.g., fuselage 104) of the aircraft 100 if the end seal body 402 were omitted.

In FIG. 13, the high-lift device 200 in the device extended position 226 has a device outer mold line 220 which may be defined by a device upper surface 228 and optionally by a device lower surface (not shown). The device outer mold line 220 has a contour. The end seal body 402 in the seal extended position 422 has a seal outer mold line 424 which may be defined by a seal upper surface 426 and a seal lower surface (not shown). The seal outer mold line 424 has a contour. In any one of the end seal device embodiments disclosed herein, the contour of the end seal body 402 in the seal extended position 422 at a location of the seal end 412 may be complementary to and/or substantially matches the contour of the high-lift device 200 in the device extended position 226 at the location of the device end 222. In one example, the contour of the seal outer mold line at the seal end 412 may result in a maximum height mismatch of no greater than 0.25 inch (6.35 mm) between the contour at the seal end 412 and the contour at the device end 222.

FIG. 14 is a sectional view of the airfoil 114 and the high-lift device 200 (e.g., leading edge slat) in the device extended position 226. The high-lift device 200 may be moved from the device retracted position 224 (FIG. 9) to the device extended position 226 via the above-described device actuation system 232. As mentioned above, the contour of the end seal body 402 at the seal end 412 (FIG. 13) may be substantially similar to the contour of the high-lift device 200 at the device end 222 (FIG. 13), at least when the end seal body 402 is in the seal extended position 422 and the high-lift device 200 is in the device extended position 226.

FIG. 15 shows the end seal body 402 in the seal extended position 422 at a location approximately midway between the seal end 412 and the pivot end 440 (FIG. 13). In some examples, the end seal body 402 may be configured such that the seal body trailing edge 410 is maintained in sealing engagement with the airfoil upper surface 120 of the airfoil leading edge 118 at least when the end seal body 402 is in the seal extended position 422 as shown in FIG. 13. Maintaining sealing engagement between the seal body trailing edge 410 and the airfoil upper surface 120 may prevent airflow between the end seal body 402 and the airfoil 114 which may otherwise adversely affect the aerodynamics of the airfoil 114. In some examples, the seal body trailing edge 410 may be maintained in sealing engagement with the airfoil upper surface 120 during movement of the end seal body 402 between the seal retracted position 420 (FIG. 8) and the seal extended position 422 (FIG. 13).

FIG. 16 shows the end seal body 402 at the seal pivot axis 442 when the end seal body 402 is in the seal extended position 422. At the seal pivot axis 442 and at any other location along the seal body spanwise portion 404, the contour of the end seal body 402 may be complementary to the contour of the airfoil outer mold line 124.

Figure 17:
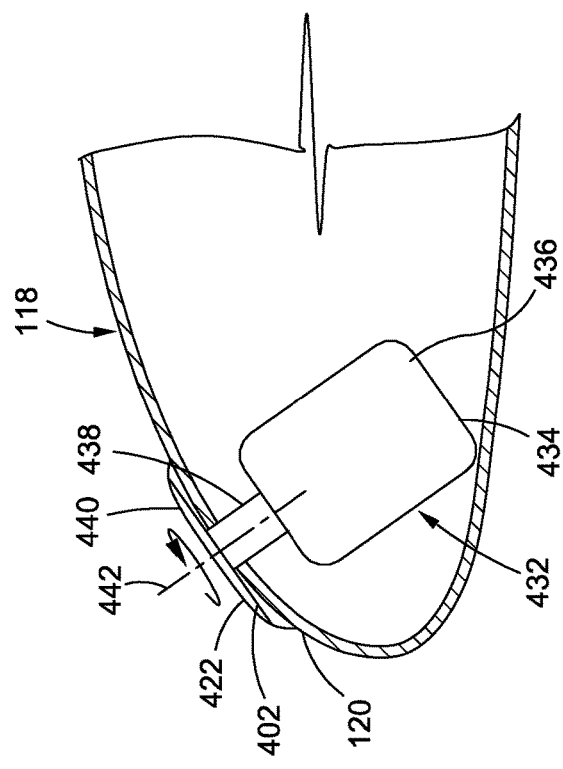
FIG. 17 is a magnified view of a portion of the airfoil leading edge showing an example of a seal actuator configured as a seal motor for rotating the end seal body between the seal retracted position and the seal extended position.

FIG. 17 shows an example of a seal actuation system 432 for rotating the end seal body 402 between the seal retracted position 420 (FIG. 13) and the seal extended position 422 (FIG. 13). In the example shown, the seal actuation system 432 is configured as a rotation mechanism 436 having a seal actuator 434 such as an electromechanical actuator or electric motor mounted to or within the airfoil leading edge 118. The rotation mechanism 436 may include a shaft 438 that is coincident with the seal pivot axis 442 and which is rotatably driven by the seal actuator 434. The pivot end 440 of the end seal body 402 may be fixedly coupled to the shaft 438 for rotating the end seal body 402 between the seal retracted position 420 to the seal extended position 422. The seal pivot axis 442 and the shaft 438 may be oriented in a manner such that the end seal body 402 in the seal retracted position 420 (FIG. 9) nests against the airfoil upper surface 120, and such that the seal end 412 (FIG. 13) of the end seal body 402 in the seal extended position 422 (FIG. 13) is located complementary to the device end 222 (FIG. 13) of the high-lift device 200 (FIG. 13) in the device extended position 226.

In an embodiment not shown, the seal actuation system may alternatively be configured as a linear actuation system (not shown) located proximate the seal end 412 and configured to rotate the end seal body 402 about a simple pivot (not shown) at the pivot end 440. Such a linear actuation system may include a guide track (not shown) or a drive screw (not shown) having one end coupled to the end seal body 402 proximate the seal end 412. The linear actuation system may also include a seal actuator (not shown) such as rotary actuator or a linear actuator that may be operatively coupled to the guide track or drive screw for moving the seal end 412 of the end seal body 402 between the seal retracted position 420 and the seal extended position 422. Such a linear actuation system may be provided in an electro-mechanical configuration, a hydraulic configuration, or a pneumatic configuration.

In any one of the end seal device 400 embodiments disclosed herein, the seal actuator 434 may be a rotary actuator or a linear actuator and may be configured as a seal motor such as a servo motor, a brushless DC motor, a stepper motor, or other motor configurations. Alternatively, the seal actuator 434 may be a hydraulic actuator that may be coupled to the hydraulic flight control system (not shown) of the aircraft 100. In still further embodiments, the seal actuator 434 may be a pneumatic actuator. In FIG. 17, the rotation mechanism 436 may be configured to move the end seal body 402 in a manner such that the seal body trailing edge 410 (FIG. 13) is maintained in contact with the airfoil upper surface 120 (FIG. 13) at least when the end seal body 402 is in the seal extended position 422 and, optionally, also during movement of the end seal body 402 between the seal retracted position 420 (FIG. 13) and the seal extended position 422. However, in an example not shown, the end seal body 402 may be configured such that a gap 429 (e.g., FIG. 43) occurs between the seal body trailing edge 410 and the airfoil upper surface 120 when the end seal body 402 is rotated into the seal extended position 422.

Figure 18:
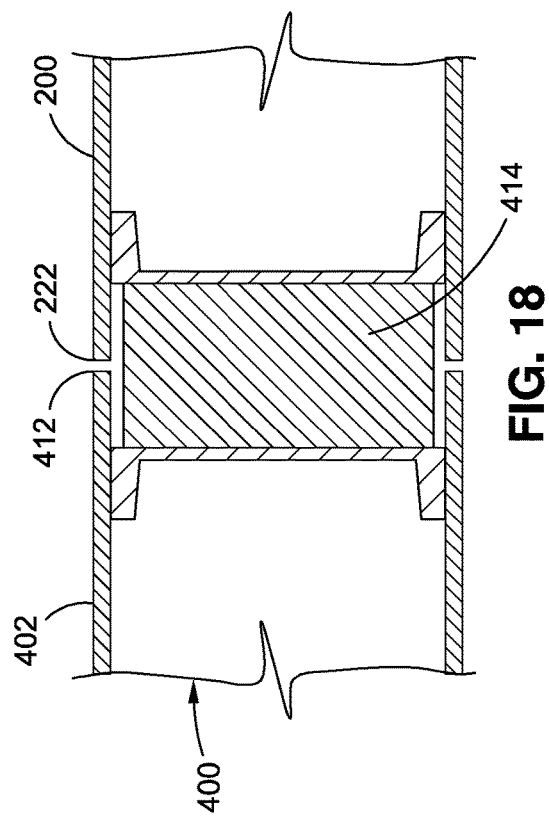
FIG. 18 is a sectional view taken along line 18 of FIG. 13 and illustrating an interface sealing element located between the seal end of the end seal body and the device end of the high-lift device and configured to prevent airflow between the seal end and the device end.

FIG. 18 is a sectional view of an interface between the device end 222 of a high-lift device 200 and the seal end 412 of an end seal body 402. The end seal device 400 may include an interface sealing element 414 located between the seal end 412 and the device end 222 of the high-lift device 200 and which may be coupled (e.g., mechanically fastened, adhesively bonded, etc.) to the seal end 412 and/or to the device end 222. The interface sealing element 414 may reduce or prevent airflow between the seal end 412 and the device end 222 at least when the end seal device 400 and the high-lift device 200 are respectively in the seal extended position 422 and the device extended position 226. In an embodiment, the interface sealing element 414 may be a non-load-carrying component formed of a resiliently compressible material such as foam rubber or other resiliently compressible and/or elastomeric material. In other embodiments, the interface sealing element 414 may be configured as a bulb seal or other seal configuration. The interface sealing element 414 may be fixedly coupled to the seal end 412 or to the device end 222 for configurations in which the end seal body 402 and the high-lift device 200 are extended and retracted independently of each other and/or for configurations in which the end seal body 402 and the high-lift device 200 are extended and/or retracted at different times and/or at different rates. For configurations in which the end seal body 402 and the high-lift device 200 are extended and/or retracted in unison, the interface sealing element 414 may be fixedly coupled to both the seal end 412 and the device end 222.

Figure 19:
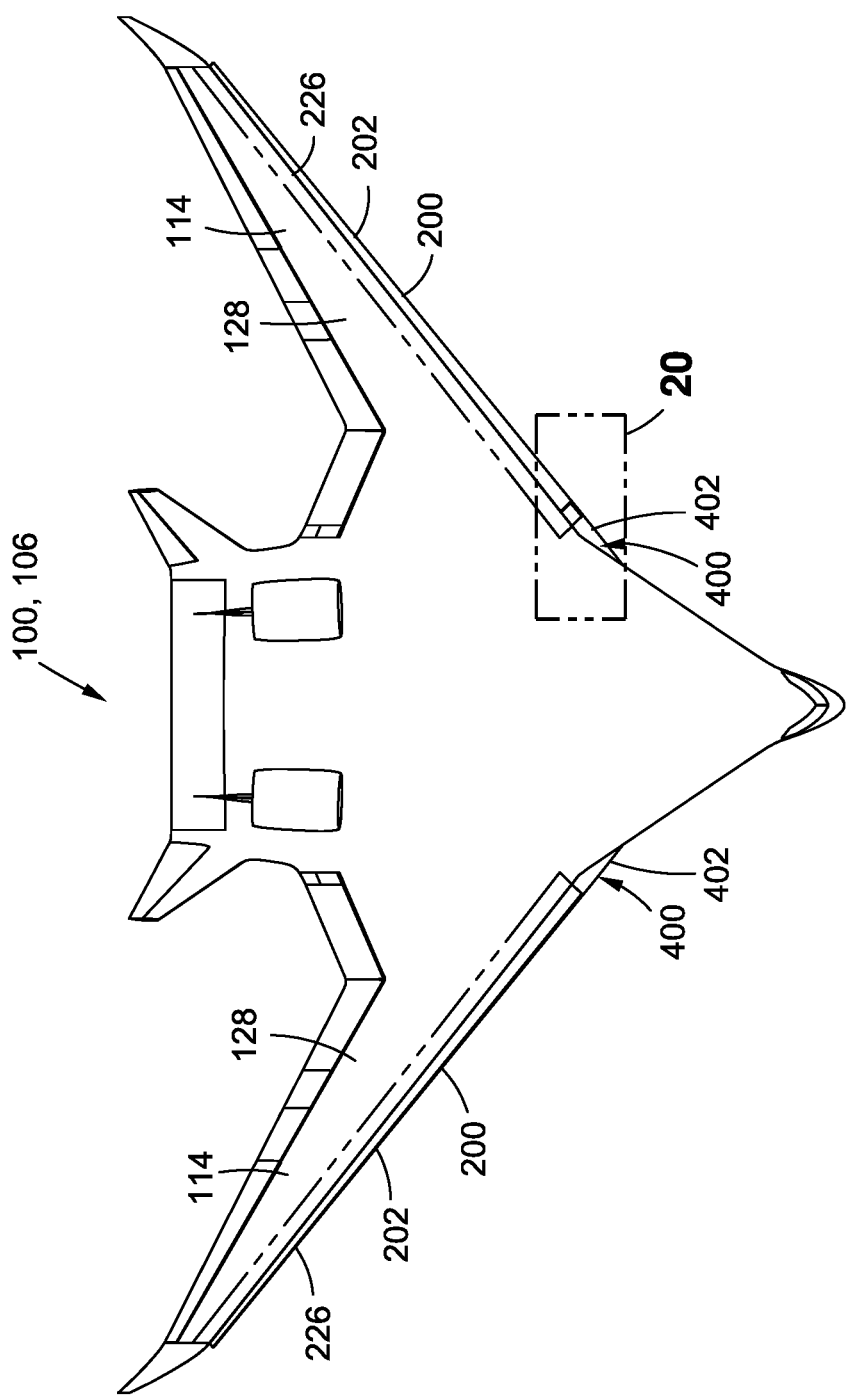
FIG. 19 is a top view of an example of a blended wing body aircraft having high-lift devices configured as leading edge slats and which are shown in a device extended position and further illustrating end seal devices shown in the seal extended position for sealing discontinuities otherwise occurring between the device ends and the wing leading edges.
Figure 20:
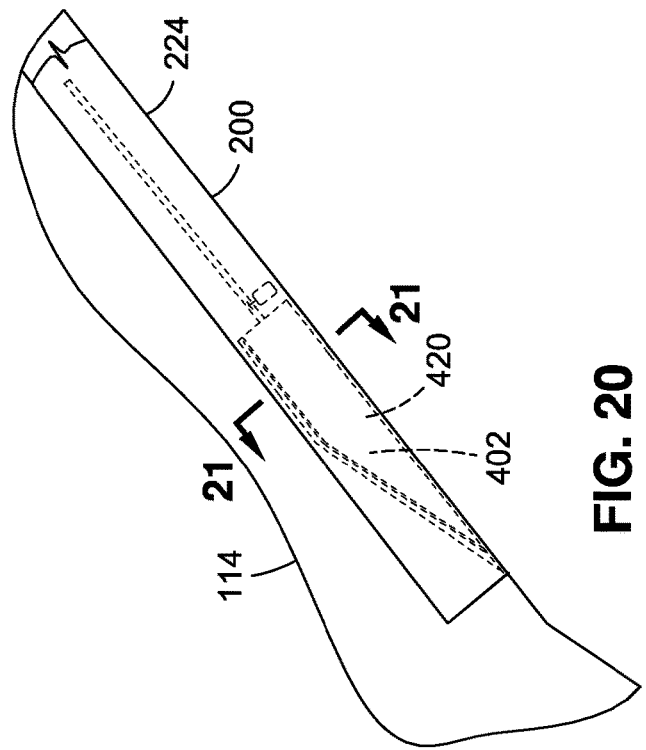
FIG. 20 is a magnified view of a portion of the blended wing body aircraft of FIG. 19 and showing an example of the end seal body in a seal retracted position and contained within the high-lift device shown in a device retracted position.
Figure 21:
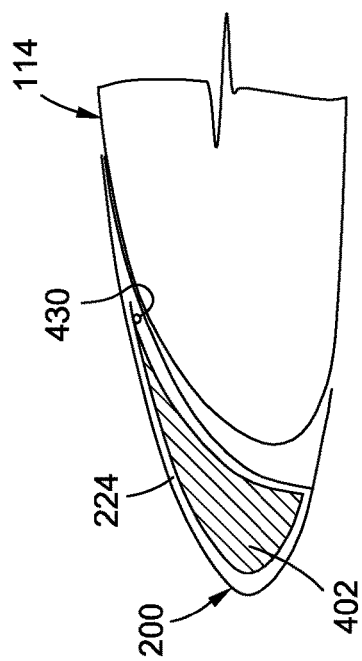
FIG. 21 is a sectional view taken along line 21 of FIG. 20 and illustrating an example of the end seal device within which the end seal body is contained.

Referring to FIGS. 19-32, shown in FIG. 19 is a top view of a blended wing body aircraft 106 having high-lift devices 200 configured as leading edge slats 202 in a device extended position 226. Also shown are end seal devices 400 in the seal extended position 422 and located on the inboard side of each one of the high-lift devices 200. FIG. 20 shows an example of an end seal body 402 configured for spanwise telescoping from a seal retracted position 420 to a seal extended position 422 (FIG. 24) as described below. The end seal body 402 is in the seal retracted position 420 and contained within the high-lift device 200 in the device retracted position 224. FIG. 21 is a sectional view of the airfoil 114 of FIG. 20 showing an example of the end seal body 402 contained within high-lift device 200 in the device retracted position 224. The end seal body 402 has a cross-sectional shape that may be complementary to and/or substantially similar to the cross-sectional shape of the interior of the high-lift device 200. The end seal body 402 may be hollow or the end seal body 402 may have a non-hollow cross section.

Figure 22:
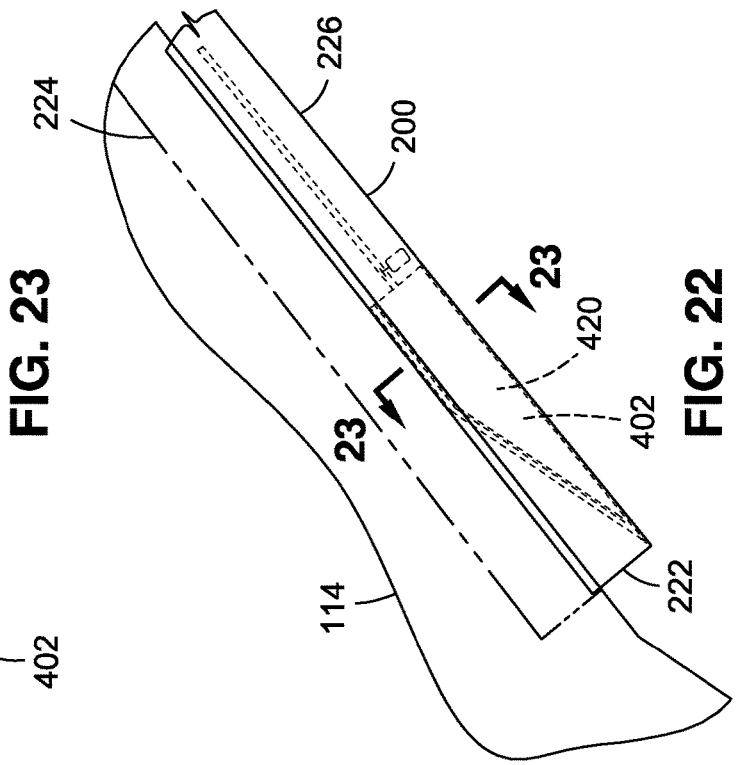
FIG. 22 is a magnified view of the portion of the blended wing body aircraft of FIG. 19 showing the high-lift device in the device extended position and containing the end seal body in the seal retracted position.
Figure 23:
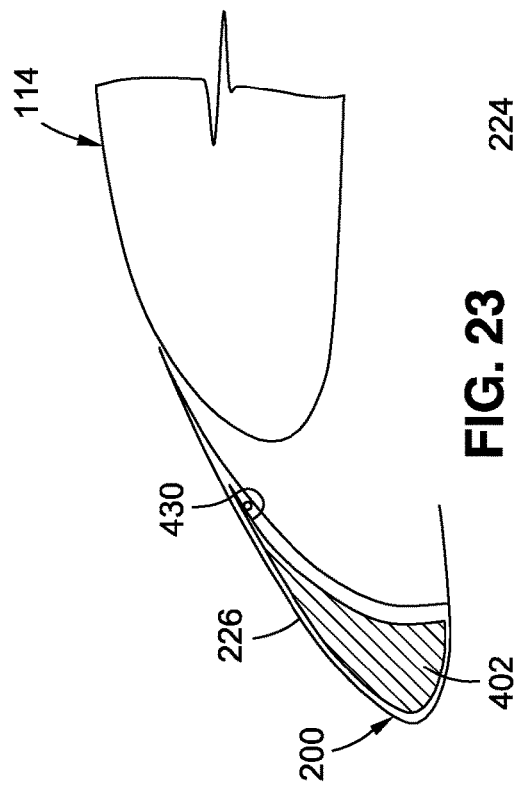
FIG. 23 is a sectional view taken along line 23 of FIG. 22 and illustrating the end seal body contained within the high-lift device in the device extended position.

FIG. 22 shows the high-lift device 200 after movement from the device retracted position 224 (shown in phantom lines) to the device extended position 226. The end seal body 402 in the seal retracted position 420 may be fully contained within the interior of the high-lift device 200 at a location proximate the device end 222. FIG. 23 is a sectional view of the end seal body 402 contained within the high-lift device 200 which is shown in the device extended position 226.

FIG. 24 shows the high-lift device 200 in the device extended position 226 and the end seal body 402 in the seal extended position 422 and telescoping out of the device end 222 of the high-lift device 200. The end seal body 402 may be configured to be translated from the seal retracted position 420 (FIG. 22) to the seal extended position 422 by means of spanwise telescoping of the end seal body 402. In this regard, the end seal body 402 may move along a spanwise direction of the high-lift device 200 and may protrude out the device end 222. FIG. 25 is a sectional view of the airfoil 114 showing the end seal body 402 in the seal extended position 422. During spanwise telescoping, at least a portion of the end seal body 402 may move out of the device end 222 print FIG. 24) of the high-lift device 200. The end seal body 402 may move in a spanwise direction until the seal body spanwise portion 404 reaches the seal extended position 422 which may be described as the point at which seal body spanwise portion 404 is in contact with a laterally adjacent portion of the airfoil leading edge 118 or aircraft body 108 of the aircraft 100.

FIG. 26 shows the seal body trailing edge 410 in contact with the airfoil upper surface 120 of the airfoil 114. In some examples, the end seal body 402 may translate in a spanwise direction until the seal body trailing edge 410 comes into contact with the airfoil leading edge 118 and/or the aircraft body 108 (FIG. 24) of the aircraft 100. For telescoping movement, the end seal body 402 may be fully contained within the high-lift device 200 when the end seal body 402 is in the seal retracted position 420, and a portion of the end seal body 402 may be contained within the high-lift device 200 when the end seal body 402 is in the seal extended position 422.

FIG. 27 shows the seal body trailing edge 410 having a gap sealing element 430 installed along an underside of the seal body spanwise portion 404 of the end seal body 402 for sealing a gap 429 (FIG. 43) otherwise occurring between the seal body spanwise portion 404 and the airfoil upper surface 120, and thereby preventing airflow between the seal body spanwise portion 404 and the airfoil upper surface 120. The gap sealing element 430 may be included with end seal devices 400 for which the high-lift device 200 (e.g., leading edge slat 202) in the device extended position 226 (FIG. 42) forms a gap 429 (FIG. 42) between the trailing edge of the high-lift device 200 and the airfoil upper surface 120 as shown in FIG. 42 and described below. In FIG. 27, the gap sealing element 430 may be a strip of resiliently compressible material or the gap sealing element 430 may be formed in an extruded shape such as a bulb shape. The gap seal element may be coupled to the seal body spanwise portion 404 via adhesive bonding, mechanical fastening, or other attachment means. The gap sealing element 430 may be located proximate the seal body trailing edge 410 and may seal the end seal body 402 to the airfoil upper surface 120 and may prevent airflow from the airfoil lower surface 122 (FIG. 26) to the airfoil upper surface 120, or vice versa, at least when the end seal body 402 is in the seal extended position 422.

FIG. 28 shows an example of a seal actuation system 432 configured as a telescoping actuation mechanism 444 for spanwise movement of the end seal body 402 (FIG. 24) between the seal extended position 422 (FIG. 22) and the seal retracted position 420 (FIG. 24). In the example shown, the telescoping actuation mechanism 444 may include a seal actuator 434 such as an electric motor mounted to contained or within the high-lift device 200. The telescoping actuation mechanism 444 may include a rack and pinion assembly 446 for linearly translating the end seal body 402 between the seal extended position 422 and the seal retracted position 420. Alternatively, the telescoping actuation mechanism 444 may include a screw drive assembly (not shown) having a threaded shaft (not shown) rotatably driven by the seal actuator 434 (e.g., electric motor) and to which the end seal body 402 may be engaged by a nut (not shown) that may be threadably mounted on the threaded shaft. The seal end 412 may be operatively coupled to the nut such that rotation of the threaded shaft by the seal actuator 434 is converted into spanwise translation of the end seal body 402 between the seal retracted position 420 and the seal extended position 422. The telescoping actuation mechanism 444 such as the rack and pinion assembly 446 or screw drive assembly (not shown) may be hydraulically actuated or pneumatically actuated. The telescoping actuation mechanism 444 may optionally be configured as a linear actuator of electric, hydraulic, or pneumatic type.

FIG. 29 is a magnified view of a portion of a blended wing body aircraft 106 showing an example of the end seal device 400 in a morphing configuration. The high-lift device 200 is shown in the device retracted position 224, and may be configured as a leading edge slat 202 (FIG. 9), a Krueger flap 204 (FIGS. 35-38), a morphing leading edge 206 (FIGS. 44-49) or other type of high-lift device 200. In the morphing configuration, the end seal body 402 comprises a portion of the airfoil leading edge 118 or aircraft body 108 that is laterally adjacent to the device end 222 of the high-lift device 200. In this regard, the laterally adjacent portion of the airfoil leading edge 118 or aircraft body 108 is configured to function as the end seal body 402 and morph between the seal retracted position 420 (FIGS. 29-30) and the seal extended position 422 (FIGS. 31-32). The end seal body 402 (e.g., the laterally adjacent portion of the airfoil leading edge 118 or aircraft body 108) may include a morphing structure (not shown) and/or may be constructed of morphable material (not shown) at least within the generally triangularly-shaped region bounded by the seal body trailing edge 410 (shown as a phantom line) and the seal end 412.

Figure 49:
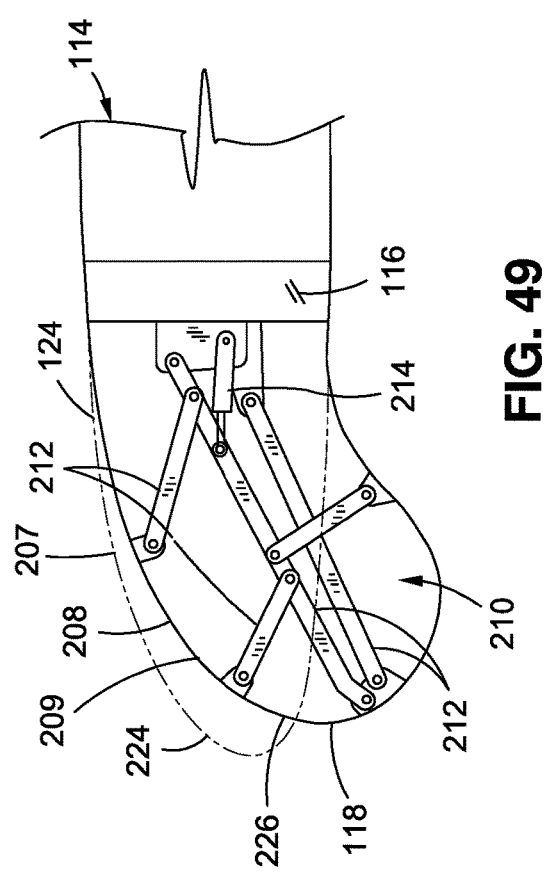
FIG. 49 is a sectional view taken along line 49 of FIG. 48 and illustrating an example of a linkage system for morphing the airfoil leading edge from the device retracted position to the device extended position.

In the present disclosure, morphable structure and/or morphable material may be described as structure or material that allows the end seal body 402 to be morphed between the seal retracted position 420 and the seal extended position 422 while providing the strength characteristics and/or stiffness characteristics required for supporting the end seal body 402 under aerodynamic and/or structural loading. An example of a morphable structure includes the plurality of morphing actuators 214 and links 212 that may be coupled to a resiliently flexible skin of a morphing leading edge 206 as shown in FIG. 49 and described below. However, a morphable structure may be provided in any number of configurations and is not limited to an arrangement of morphing actuators 214 and links 212. An example of a morphable material may include the above-mentioned flexible skin which may be formed of metallic material (e.g., titanium, steel) and/or non-metallic material such as fiber-reinforced polymer matrix material such as composite material (e.g., graphite-epoxy). Alternatively or additionally, an end seal device 400 in a morphing configuration may include a morphing actuation mechanism 450 operatively coupled to an end seal body 402 that may be formed of a flexible and resiliently stretchable skin (not shown) supported by a resiliently flexible lining or core (not shown) having strength and stiffness characteristics capable of supporting the end seal body 402 under aerodynamic loading in both the seal retracted position 420 and seal extended position 422.

FIG. 30 is a sectional view of FIG. 29 showing an example of a morphing actuation mechanism 450 for actuating the end seal body 402 (e.g., the laterally adjacent portion of the airfoil leading edge 118 or aircraft body 108) between the seal retracted position 420 and the seal extended position 422 (FIGS. 31-32). In the example shown, the morphing actuation mechanism 450 includes at least one morphing actuator 214 which is configured as a push-pull actuator mounted to and/or within the airfoil leading edge 118. One end of the morphing actuator 214 may be coupled to a spar 116 of the airfoil 114, and an opposite end of the morphing actuator 214 may be coupled to an interior of the skin 208 of the end seal body 402 such that retraction and extension of the morphing actuator 214 causes morphing of the end seal body 402 between the seal retracted position 420 and the seal extended position 422 (FIGS. 31-32).

FIG. 31 shows the portion of the blended wing body aircraft 106 of FIG. 29 illustrating the high-lift device 200 in the device extended position 226. Also shown is the end seal body 402 after being morphed into the seal extended position 422. In the seal extended position 422, the end seal body 402 fills a discontinuity 300 (e.g., FIG. 5) that would otherwise occur between the device end 222 and the laterally adjacent portion of the airfoil leading edge 118 or aircraft body 108. When morphed into the seal extended position 422, the contour of the end seal body 402 at the location of the seal end 412 may be complementary to and/or may substantially match the contour of the device end 222 of the high-lift device 200 in the device extended position 226.

FIG. 32 is a sectional view of FIG. 31 showing the end seal body 402 after being morphed by the morphing actuator 214 into the seal extended position 422. The skin 208 and/or internal supporting structure (not shown) of the end seal body 402 may be configured to stretch during morphing from the seal retracted position 420 to the seal extended position 422, and may be configured to return to the original unstretched shape of the skin 208 when the morphing actuator 214 morphs the end seal body 402 back to the seal retracted position 420. Although shown as having a single morphing actuator 214 located proximate the seal end 412, the morphing actuation mechanism 450 may include any number of any one or more of a variety of different types of actuators (e.g., rotary, linear, electro-mechanical, hydraulic, pneumatic, etc.) mounted at one or more locations along the length of the end seal body 402.

Although FIGS. 29-32 illustrate the end seal body 402 in the context of a blended wing body aircraft 106, the morphing configuration of the end seal body 402 may be implemented on any one of a variety of different types of aircraft such as the tube-and-wing aircraft 102 shown in FIGS. 33-34 and described below. In addition, the end seal body 402 is not limited to morphing from a laterally adjacent portion of an airfoil leading edge 118, and may alternatively be configured to morph from a laterally adjacent portion of an aircraft body 108. Although not shown, the seal end 412 of the end seal body 402 in the morphing configuration may be coupled to the device end 222 of the high-lift device 200 (e.g., FIG. 18) for configurations in which the high-lift device 200 and the end seal body 402 move in unison with each other. Alternatively, the end seal body 402 in the morphing configuration may be non-coupled to the high-lift device 200 such that the end seal body 402 may move independently of the high-lift device 200.

Advantageously, the morphing configuration (FIGS. 29-32) of the end seal body 402 may reduce or avoid the occurrence of sharp or abrupt changes in the surface contour of the end seal body 402 along the seal body trailing edge 410 at the interface with the airfoil upper surface 120 and at the interface with the airfoil lower surface 122. For example, in both the seal retracted position 420 (FIG. 30) and the seal extended position 422 (FIG. 32), the surface of the end seal body 402 at the seal upper surface 426 and at the seal lower surface 428 may remain tangent respectively to the airfoil upper surface 120 and airfoil lower surface 122 at the seal body trailing edge 410. By avoiding sharp or abrupt changes in the surface of the airfoil 114 when the end seal body 402 is in the seal retracted position 420 and seal extended position 422, disruption of the airflow over the airfoil 114 may be avoided which advantageously may promote laminar flow over the airfoil 114 at high angles of attack.

Referring to FIGS. 33-34, shown is an example of a tube-and-wing aircraft 102 that may have one or more of the presently-disclosed end seal devices 400. FIG. 33 shows the tube-and-wing aircraft 102 having a fuselage 104 and a pair of wings 128. In the present disclosure, the fuselage 104 of a tube-and-wing aircraft 102 comprises the aircraft body 108. The fuselage 104 may have a tubular shape. The tube-and-wing aircraft 102 further includes tail surfaces 132 such as a horizontal tail 134 and a vertical tail 136, any one of which may include one or more end seal devices 400. The wings 128 of the tube-and-wing aircraft 102 may include one or more trailing edge devices 126 such as ailerons and flaps. In addition, the wings 128 may include one or more high-lift devices 200 which may be in a device retracted position 224 in FIG. 33. One or more of the high-lift devices 200 may be movable between a device retracted position 224 and a device extended position 226. FIG. 34 shows the tube-and-wing aircraft 102 in which the high-lift devices 200 are configured as Krueger flaps 204 and which are shown in the device extended position 226.

Figure 35:
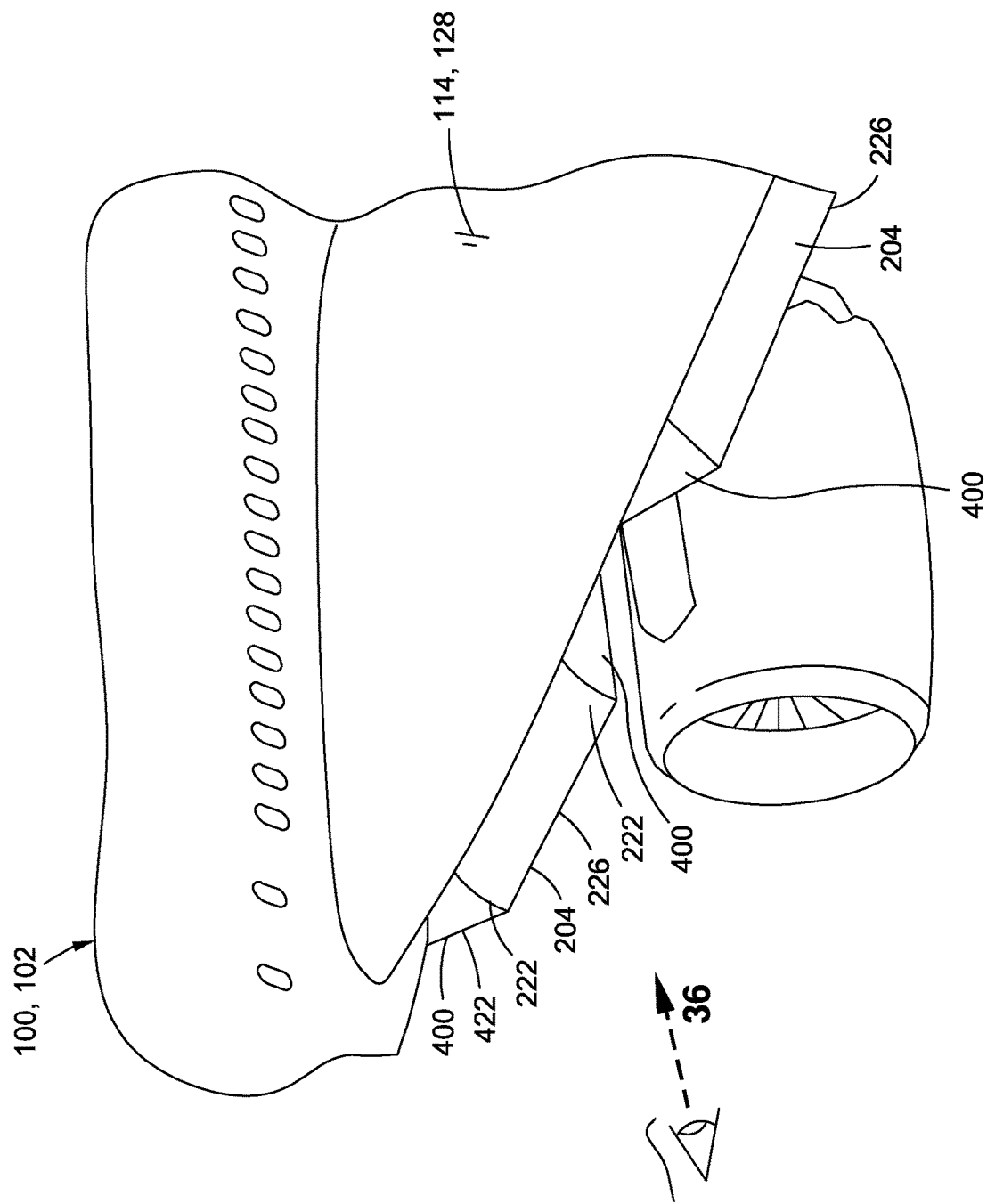
FIG. 35 is a magnified view of the portion of the tube-and-wing aircraft of FIG. 34 showing high-lift devices in a device extended position and further illustrating end seal devices on each of opposing device ends of each high-lift device for filling discontinuities that otherwise would occur between the device ends and the wing leading edge.
Figure 36:
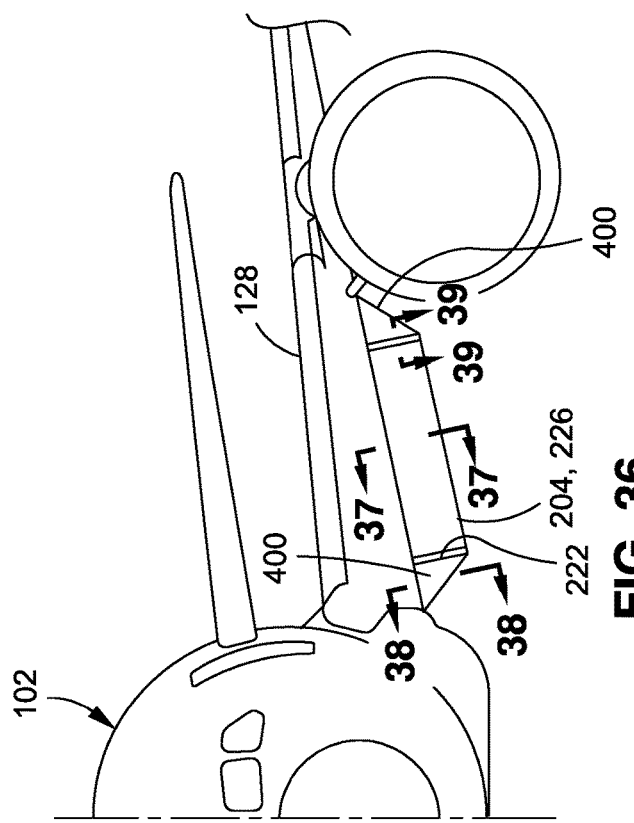
FIG. 36 is a front view of the tube-and-wing aircraft of FIG. 35 illustrating a high-lift device in the device extended position and a pair of end seal devices on each of opposing device ends of the high-lift device.
Figure 37:
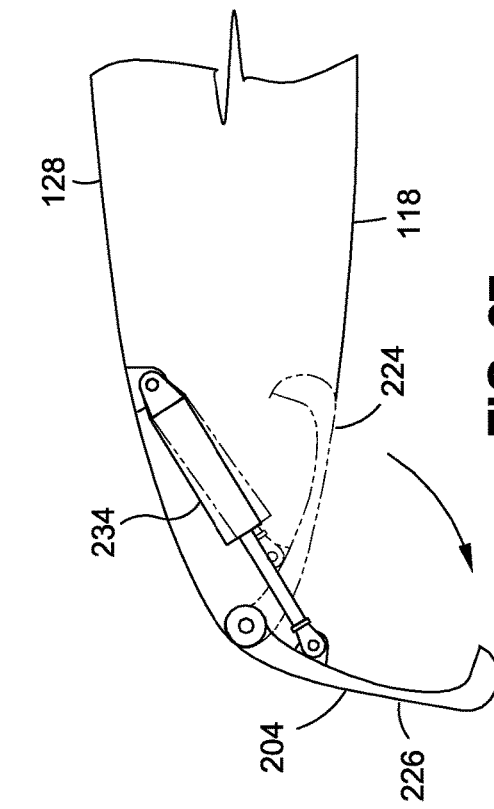
FIG. 37 is a sectional view taken along line 37 of FIG. 36 and illustrating an example of the high-lift device configured as a Krueger flap shown in a device extended position.

FIG. 35 shows a portion of a tube-and-wing aircraft 102 illustrating the Krueger flaps 204 in a device extended position 226. Also shown are end seal devices 400 mounted on each of opposing device ends 222 of each Krueger flap 204 for filling discontinuities 300 (FIG. 3) that otherwise would occur if the end seal devices 400 were omitted from the aircraft 100. FIG. 36 is a front view of the tube-and-wing aircraft 102 showing one of the Krueger flaps 204 in the device extended position 226. A pair of end seal devices 400 are located on each of opposing device ends 222 of the Krueger flap 204. FIG. 37 is a sectional view of the wing 128 showing an example of the Krueger flap 204 after movement from the device retracted position 224 to the device extended position 226. In the device retracted position 224, the Krueger flap 204 may form a portion of the underside of the airfoil leading edge 118 and may be rotated outwardly and/or downwardly into the device extended position 226 for increasing the camber and/or the surface area of the wing 128. The Krueger flap 204 may be actuated by a device actuator 234 which, in the example shown, may be configured as an electro-mechanical actuator, a pneumatic actuator, or a hydraulic actuator that may be coupled to the hydraulic flight control system of the aircraft 100.

Figure 38:
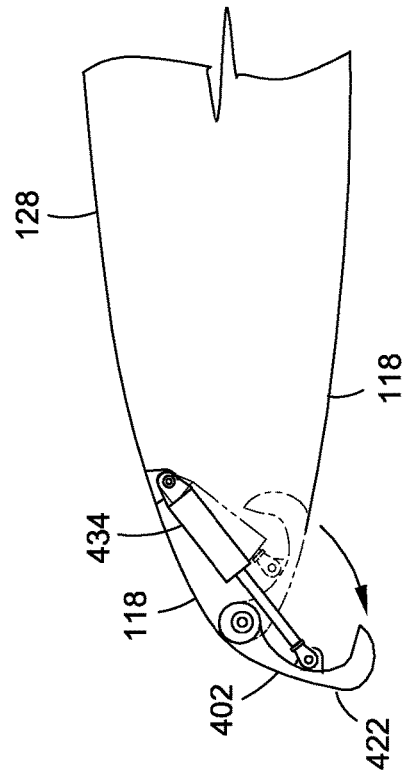
FIG. 38 is a sectional view taken along line 38 of FIG. 36 and illustrating an example of an end seal body in a flap configuration similar to the Krueger flap of the high-lift device.

FIG. 38 is a sectional view of an example of an end seal body 402 in a flap configuration. The end seal body 402 may be moved into the seal extended position 422 in a manner similar to the actuation of the Krueger flap 204. For example, a forward portion of the end seal body 402 may be hingedly coupled to the airfoil leading edge 118 and may be configured to be rotated outwardly and downwardly into the seal extended position 422 using a relatively small seal actuator 434 such as an electrical-mechanical actuator, a pneumatic actuator, or a hydraulic actuator.

Figure 39:
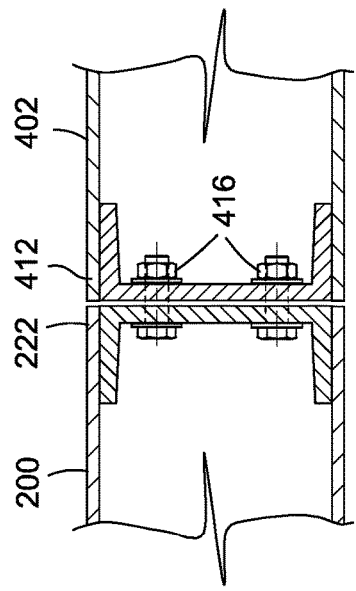
FIG. 39 is a sectional view taken along line 39 of FIG. 36 and illustrating the seal end rigidly coupled to the device end in an example configuration in which the high-lift device and the end seal device move in unison.

In any one of the end seal device embodiments disclosed herein, the end seal body 402 may be configured such that actuation of the high-lift device 200 between the device retracted position 224 and the device extended position 226 also causes the end seal body 402 to move between the seal retracted position 420 and the seal extended position 422. In the example of the Krueger flap 204 shown in FIGS. 36-37, the end seal body 402 may be configured such that the device actuator 234 moves the end seal body 402 between the seal retracted position 420 and seal extended position 422 in unison with movement of the Krueger flap 204 between the device retracted position 224 and the device extended position 226. FIG. 39 is a sectional view of a portion of the end seal body 402 and a portion of the high-lift device 200 and illustrates an arrangement in which the seal end 412 is rigidly coupled to the device end 222. The rigid attachment may include one or more mechanical fasteners 416 fixedly securing the seal end 412 to the device end 222 such that the high-lift device 200 and the end seal body 402 move in unison, such as during actuation of the high-lift device 200 by the device actuator 234 (FIG. 37).

Figure 41:
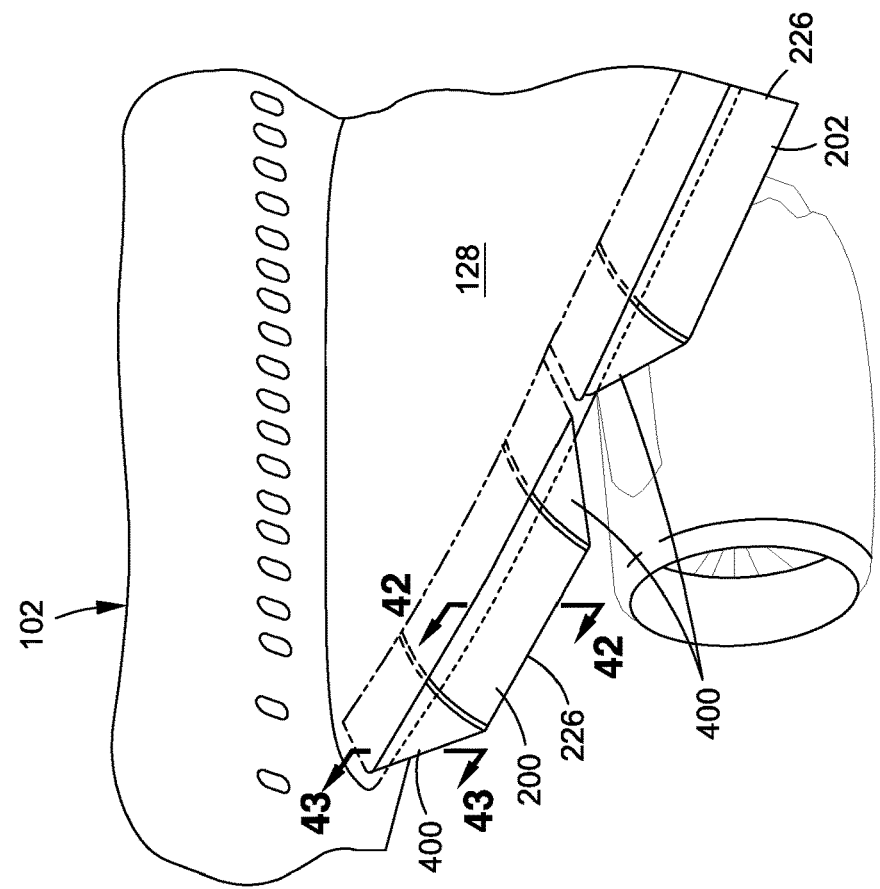
FIG. 41 is a perspective view of the high-lift devices and end seal devices of FIG. 40 shown respectively in a device extended position and seal extended position.
Figure 40:
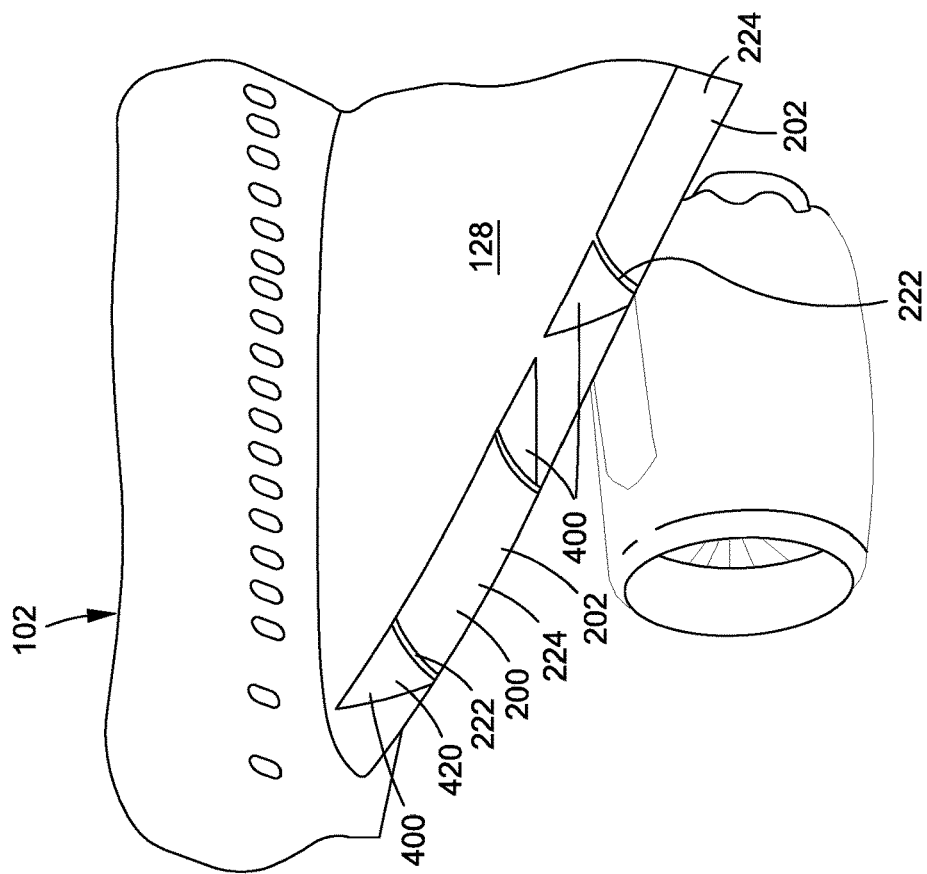
FIG. 40 is a perspective view of a portion of a tube-and-wing aircraft illustrating the high-lift devices as leading edge slats shown in a device retracted position and further illustrating a pair of end seal devices on each of opposing device ends of the high-lift device shown in a seal retracted position.

Referring to FIGS. 40-42, shown in FIG. 40 is a portion of a tube-and-wing aircraft 102 of which the high-lift devices 200 are configured as leading edge slats 202 movably coupled to the wing 128. The leading edge slats 202 are shown in a device retracted position 224. Also shown are a pair of end seal devices 400 on opposite sides of each one of the high-lift devices 200 each having an end seal body 402 shown in the seal retracted position 420. Each one of the end seal bodies 402 may have a generally triangular shape. The end seal bodies 402 are located proximate the opposing device ends 222 of each one of the leading edge slats 202. FIG. 41 shows the leading edge slats 202 in the device extended position 226. The end seal devices 400 are each shown in the seal extended position 422.

FIG. 42 is a sectional view of in airfoil (e.g., a wing 128) showing a leading edge slat 202 in the device extended position 226. Similar to the above-described device actuation system 232 shown in FIG. 4, the leading edge slat 202 may be actuated by a device actuator 234 such as a torque tube (not shown) or electric motor (not shown), either of which may have a pinion gear 236 for engaging teeth (not shown) of an arcuate guide track 238. Rotation of the device actuator causes movement of the guide track 238 for moving the leading edge slat 202 between the device retracted position 224 and the device extended position 226. In the example, shown, the leading edge slat 202 is configured to form a gap 429 between the leading edge slat 202 and the airfoil upper surface 120 when the leading edge slat 202 is in the device extended position 226. The gap 429 may allow air to flow upwardly through the gap and then generally aftwardly to energize the airflow over the airfoil upper surface 120 and thereby promote the attachment of airflow to the airfoil upper surface 120 such as at high angles of attack.

FIG. 43 is a sectional view taken of the end seal device 400 in a slat configuration arranged similar to the configuration of the leading edge slat 202. The end seal device 400 may be configured to move between the seal retracted position 420 and the seal extended position 422 via chordwise movement of the end seal body 402 relative to and/or over the airfoil leading edge 118. For example, the end seal body 402 may be configured to move along the airfoil upper surface 120 generally parallel to the direction of movement of the leading edge slat 202. Similar to the above-described gap 429 formed between the trailing edge of the leading edge slat 202 and the airfoil upper surface 120 when the leading edge slat 202 is in the device extended position 226, the end seal device 400 in the device extended position 226 may also be configured to form a gap 429 between the seal body trailing edge 410 of the seal body spanwise portion 404 and the airfoil upper surface 120. The gap 429 may allow air to flow upwardly between the seal body spanwise portion 404 and the airfoil upper surface 120 and then aftwardly along the airfoil upper surface 120 to promote the attachment of airflow to the airfoil upper surface 120 at high angles of attack.

In FIG. 43, the end seal device 400 may include a chordwise actuation mechanism 448 including a seal actuator 434 mounted to the airfoil leading edge 118 for actuating the end seal body 402. The chordwise actuation mechanism 448 may include at least one arcuate guide track 238 similar to the guide track 238 described above for the leading edge slat 202. The guide track 238 for the end seal body 402 may be supported by one or more guide rollers 242 mounted to the airfoil leading edge 118. As described above, the guide tracks 238 may include a track forward end 240 coupled to the end seal body 402. The seal actuator 434 may be configured as an electric motor having a pinion gear 236 for engaging teeth (not shown) of the guide track 238 such that rotation of the pinion gear 236 via the electric motor causes chordwise movement of the end seal body 402 between the seal retracted position 420 and the seal extended position 422. Alternatively, the seal actuator 434 may couple to the device actuator 234 (e.g., torque tube) such that actuation of the leading edge slats 202 causes simultaneous actuation of the end seal bodies 402.

Referring to FIGS. 44-50, shown in FIG. 44 is an example of an airfoil 114 in which a portion of the airfoil leading edge 118 is configured as a morphing leading edge 206 which functions as a high-lift device 200 for the airfoil 114. The morphing leading edge 206 is shown in a device retracted position 224 in FIG. 44. Advantageously, the morphing leading edge 206 provides a means for temporarily increasing the camber of the airfoil 114 while maintaining laminar flow over the airfoil 114 due to the avoidance of steps, gaps, and/or sharp edges otherwise associated with the deployment of conventional leading edge devices. FIG. 45 shows the morphing leading edge 206 in the device extended position 226 and which may result in the formation of vortices 302 emanating from the device ends 222 of the morphing leading edge 206 due to exposure of the device ends 222 to oncoming airflow.

FIG. 46 shows the morphing leading edge 206 in the device extended position 226. Also shown is a pair of end seal devices 400 in the seal retracted position 420. Each one of the end seal devices 400 has an end seal body 402 that may be contained within the morphing leading edge 206 at a location proximate the device ends 222 of the morphing leading edge 206. FIG. 47 shows the pair of end seal bodies 402 after being telescopically translated outwardly respectively from the opposing pair of device ends 222 of the morphing leading edge 206.

Figure 48:
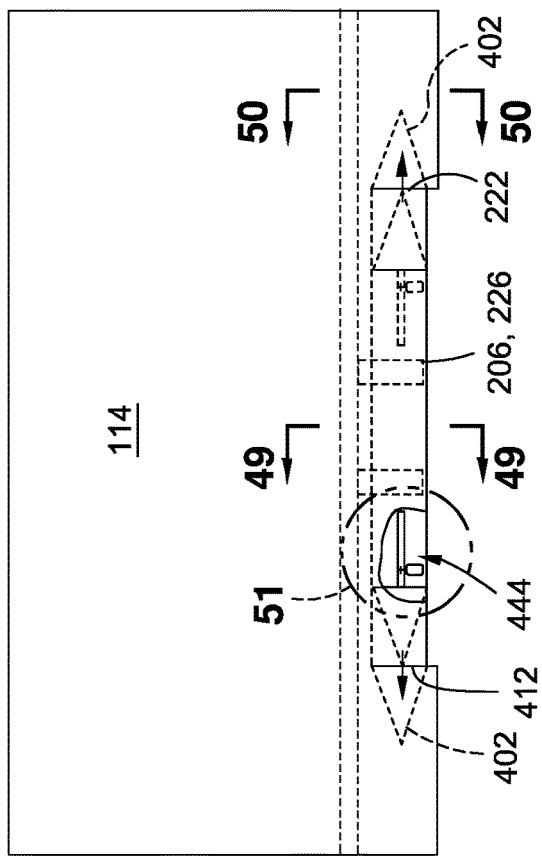
FIG. 48 is a plan view of the airfoil of FIG. 47 showing the morphing leading edge in the device extended position and showing the pair of end seal devices for telescoping out of the device ends.

FIG. 48 is a plan view of the airfoil 114 showing the morphing leading edge 206 in the device extended position 226 and also showing the pair of end seal bodies 402 configured to be translated telescopically out of the device ends 222. FIG. 49 is a sectional view of the airfoil 114 showing an example of a linkage system 210 that may be implemented for morphing the airfoil leading edge 118 from the device retracted position 224 to the device extended position 226. The linkage system 210 may include a plurality of links 212 that may be pivotably coupled at one end to a spar 116 of the airfoil 114 and at an opposite end to the skin 208 that defines the morphing leading edge 206. The linkage system 210 may further include one or more morphing actuators 214 coupled to the spar 116 and pivotably connected to one or more of the links 212. The links 212 may be configured such that actuation of the morphing actuator 214 causes the skin 208 of the morphing leading edge 206 to transition between a first shape 207 that substantially matches the contour of the airfoil outer mold line 124 when the morphing leading edge 206 is in the device retracted position, to a second shape 209 in which the morphing leading edge 206 is curved or drooped downwardly in the device extended position 226.

Figure 50:
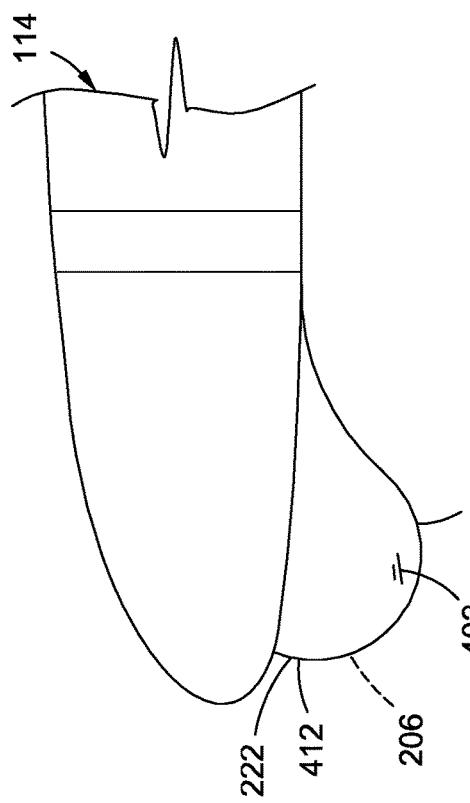
FIG. 50 is a sectional view taken along line 50 of FIG. 48 and illustrating an example of an end seal body in the seal extended position.

FIG. 50 is a sectional view of the morphing leading edge 206 showing an example of the end seal body 402 in the seal extended position 422 after telescopic movement of the end seal body 402 out of interior of the morphing leading edge 206. In an embodiment, the end seal body 402 may be telescopically moved out of the device end 222 (FIG. 48) until the seal end 412 (FIG. 48) of the end seal body 402 is aligned with the device end 222 of the morphing leading edge 206. The contour of the end seal body 402 at the seal end 412 may substantially match contour of the morphing leading edge 206 at the device end 222 when the end seal body 402 is in the seal extended position 422 such that airflow is prevented from flowing between the seal end 412 of the end seal body 402 and the device end 222 of the morphing leading edge 206.

Figure 51:
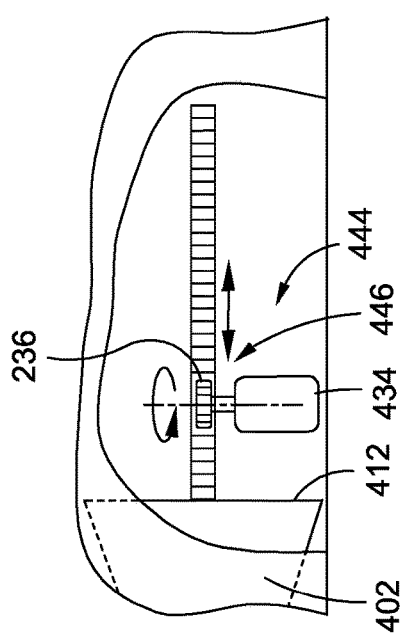
FIG. 51 is a magnified view of a portion of the airfoil of FIG. 48 and illustrating an example of a telescoping actuation mechanism for spanwise translation of each end seal body between the seal retracted position in the seal extended position.

FIG. 51 shows an example of a telescoping actuation mechanism 444 for spanwise translation of each end seal body 402 between the seal retracted position 420 (FIG. 48) and the seal extended position 422 (FIG. 48). Similar to the above-described example shown in FIG. 28, each telescoping actuation mechanism 444 may include a seal actuator 434 having a pinion gear 236 operatively engaged to a rack and pinion assembly 446. Rotation of the pinion gear 236 via the seal actuator 434 may result in linear translation of the end seal body 402 between the seal extended position 422 and the seal retracted position 420. However, the telescoping actuation mechanism 444 may be provided in an alternative configuration such as a screw drive assembly (not shown).

Referring to FIGS. 52-62, shown are examples of the end seal device 400 (e.g., FIGS. 54-55, 59-60) configured to be non-movably fixed in the seal extended position 422. Such end seal devices 400 may be used in combination with high-lift devices 200 that may also be permanently fixed to the airfoil 114 in the device extended position 226. End seal devices 400 that are non-movably fixed to the airfoil 114 may be incapable of being moved to a device retracted position (not shown).

For example, FIGS. 52-53 show an airfoil 114 in which a portion of the airfoil leading edge 118 is configured as a leading edge cuff 218 and which functions as a high-lift device 200 of the airfoil 114. As known in the art, a leading edge cuff 218 may be fixedly incorporated into or installed on an airfoil leading edge 118 and may have a slightly drooped lower portion resulting in a locally reduced angle of incidence of the airfoil 114 which may improve the stall characteristics of the aircraft 100. FIGS. 52-53 illustrate vortices 302 that may emanate from the device ends 222 of the leading edge cuff 218 due to exposure of the device ends 222 due to oncoming airflow.

Figure 54:
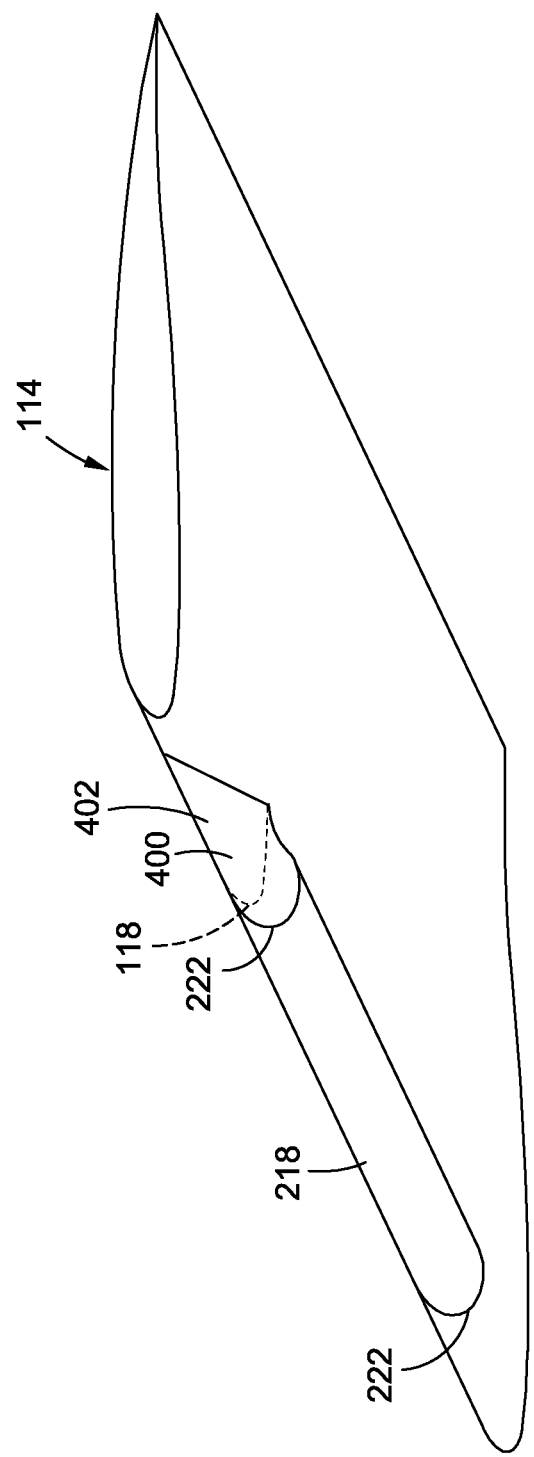
FIG. 54 is a bottom perspective view of the airfoil of FIG. 53 showing the leading edge cuff having an end seal device on each of opposing device ends of the leading edge cuff.

FIG. 54 shows an example of the airfoil 114 having an end seal device 400 (e.g., an end seal body 402) located on each of opposing device ends 222 of the leading edge cuff 218. Each end seal device 400 may be incorporated into or integral with the airfoil 114. Alternatively, each end seal device 400 may be attached to the airfoil 114 such as via mechanical fastening and/or adhesive bonding or via other means. FIG. 55 is a plan view of the airfoil 114 showing a pair of end seal bodies 402 which may be fixedly mounted to the airfoil 114 at each of opposing device ends 222 of the leading edge cuff 218. In an embodiment, each one of the end seal body 402 may have a semi-conical shape tapering in size from the seal end 412 to the opposing end of the end seal body 402. The contour of each end seal body 402 at the seal end 412 may be complementary to the contour at the device end 222 of the leading edge cuff 218. FIG. 56 is a sectional view of the device outer mold line 220 of the leading edge cuff 218 showing the drooped lower portion of the leading edge cuff 218 relative to the contour of the airfoil leading edge 118. FIG. 57 shows the contour of the seal outer mold line 424 of the end seal body 402 at the seal end 412 substantially matching the contour of the device outer mold line 220 of the leading edge cuff 218 at the device end 222.

Referring to FIGS. 58-62, shown in FIG. 58 is an example of an airfoil 114 having a high-lift device 200 configured as a fixed slot 216 mounted on the airfoil leading edge 118. Also shown are vortices 302 that may emanate from the device ends 222 of the fixed slot 216 as a result of oncoming airflow impinging on the device ends 222. FIG. 59 shows the airfoil 114 having an end seal device 400 (e.g., an end seal body 402) located on each of opposing device ends 222 of the fixed slot 216, and which may advantageously reduce or prevent the formation of vortices 302 (FIG. 58) otherwise generated as a result of the discontinuity 300 otherwise occurring at the device ends 222. FIG. 60 is a plan view of the airfoil 114 showing the pair of end seal bodies 402 respectively located on opposing device ends 222 of the fixed slot 216. Similar to the above-described example of the leading edge cuff 218 (FIG. 52), the end seal bodies 402 for the fixed slot 216 may also have a semi-conical shape.

FIG. 61 is a sectional view showing an example of the fixed slot 216 mounted on the airfoil leading edge 118. FIG. 62 is a sectional view showing the seal outer mold line 424 of the end seal body 402 substantially matching the device outer mold line 220 of the fixed slot 216. As mentioned above for the leading edge cuff 218, the end seal bodies 402 for the fixed slot 216 may be integrally formed with the airfoil 114 and fixed slot 216. Alternatively, the end seal bodies 402 for the leading edge cuff 218 may be installed on the airfoil 114 such as by using mechanical fasteners and/or adhesive bonding. In this regard, in any of the end seal device 400 embodiments disclosed herein, the end seal devices 400 may be configured to be assembled during manufacturing of the airfoil 114. Alternatively, the end seal devices 400 may be configured to be installed on an airfoil 114 as an aftermarket component.

Although the presently-disclosed end seal device 400 is shown and described in the context of a wing 128, the end seal device 400 may be configured to be included with and/or mounted to any one of a variety of different types of airfoils 114 and/or lifting surfaces such as a canard, a tail surface 132 (FIG. 1) such as a horizontal tail 134 (FIG. 1) or a vertical tail 136 (FIG. 1), a ruddervator, a wing tip device 130 (FIG. 1), or any other type of airfoil 114 and/or lifting surface, and is not limited to being coupled to a wing 128 of an aircraft 100. In addition, although the end seal device 400 is shown in FIGS. 7, 13, and 19 as being mounted to the wings 128 of a blended wing body aircraft 106 as described above, the presently-disclosed end seal device 400 may be mounted to an airfoil 114 of any one a variety of different types of fixed-wing aircraft including, but not limited to, a tube-and-wing aircraft 102 as shown in FIGS. 33-34 and described above. In addition, the presently-disclosed end seal device 400 may be mounted to one or more airfoils 114 of a rotary-wing aircraft, a tilt-wing aircraft, a vertical-takeoff-and-landing (VTOL) aircraft, and any other type of powered or non-powered aircraft.

Figure 63:
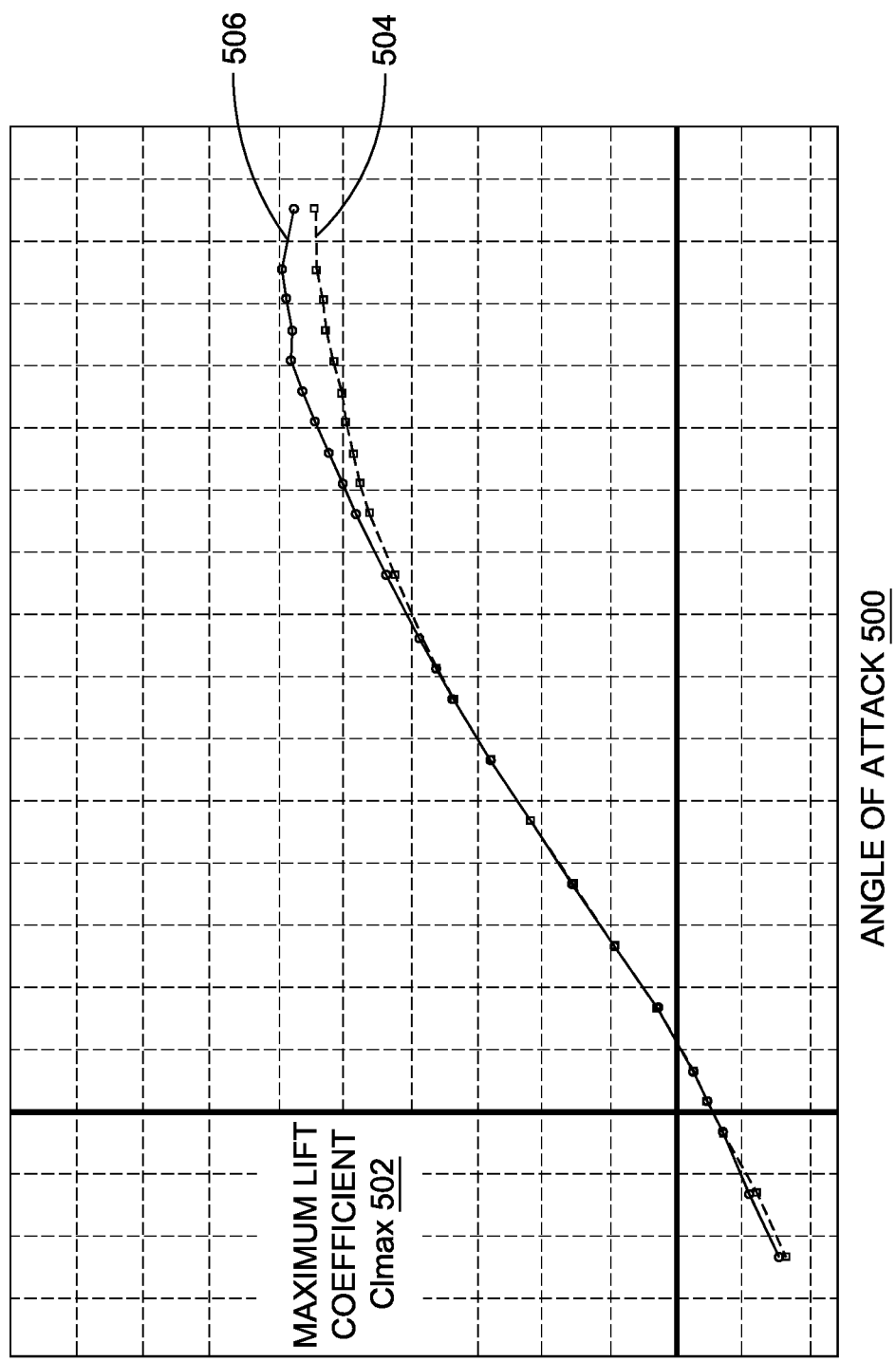
FIG. 63 is a graph plotting angle of attack versus maximum lift coefficient and illustrating an increase in maximum lift coefficient for an aircraft having an end seal devices relative to an aircraft in which the end seal devices are omitted.

FIG. 63 is a graph plotting angle of attack 500 versus maximum lift coefficient 502 ($C_{Lmax}$) of a blended wing body aircraft 106 (e.g., FIGS. 2 and 10) during wind tunnel testing. The blended wing body aircraft 106 has Krueger flaps 204 in the device extended position 226 (FIGS. 2 and 12) during the wind tunnel testing. The graph shows two plots of angle of attack 500 versus maximum lift coefficient 502 including a plot for a first aircraft configuration 504 in which end seal devices 400 were omitted from the blended wing body aircraft 106 similar to the configuration shown in FIG. 2, and a plot for a second aircraft configuration 506 in which end seal devices 400 in the seal extended position 422 were included with the blended wing body aircraft 106 similar to the configuration shown in FIG. 12. As can be seen, the second aircraft configuration 506 with end seal devices 400 resulted in a significant increase maximum lift coefficient 502 relative to the first aircraft configuration 504 from which the end seal devices 400 were omitted.

Referring to FIGS. 64-69, shown in each figure are portions of a blended wing body aircraft 106 having Krueger flaps 204 in a device extended position 226. The blended wing body aircraft 106 was subjected to wind tunnel testing for measuring the effect of end seal devices 400 on the flowfield at a location upstream of the engine inlets 112. The blended wing body aircraft 106 was oriented such that the wings 128 were at a positive angle of attack of 20 degrees during measurement of the longitudinal velocity. The longitudinal velocity was measured using particle image velocimetry which allowed for optical visualization of the flowfield. Each one of FIGS. 64-69 includes an insert 514 that graphically illustrates the velocity measurements according to a legend 516 of longitudinal velocity located in the lower right-hand corner of each of FIGS. 64-69. The longitudinal velocity in each legend 516 is divided into three (3) velocity ranges including low, medium, and high.

Figure 64:
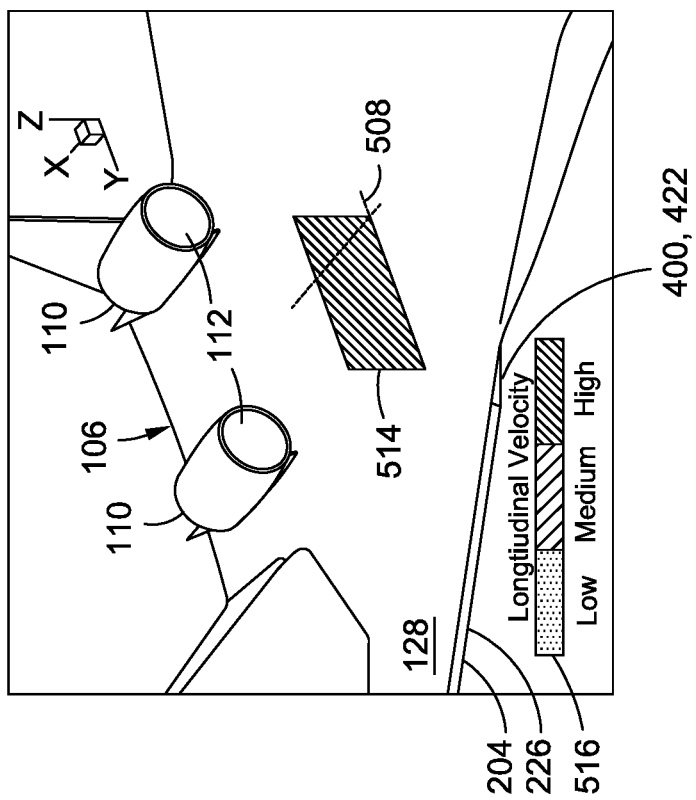
FIG. 64 is a perspective view of a portion of a blended wing body aircraft having a high-lift device configured as a Krueger flap in a device extended position and in which the end seal device was omitted during wind tunnel testing and further illustrating in the inset a graphical representation of the longitudinal velocity in the flowfield measured at a first fuselage station.
Figure 65:
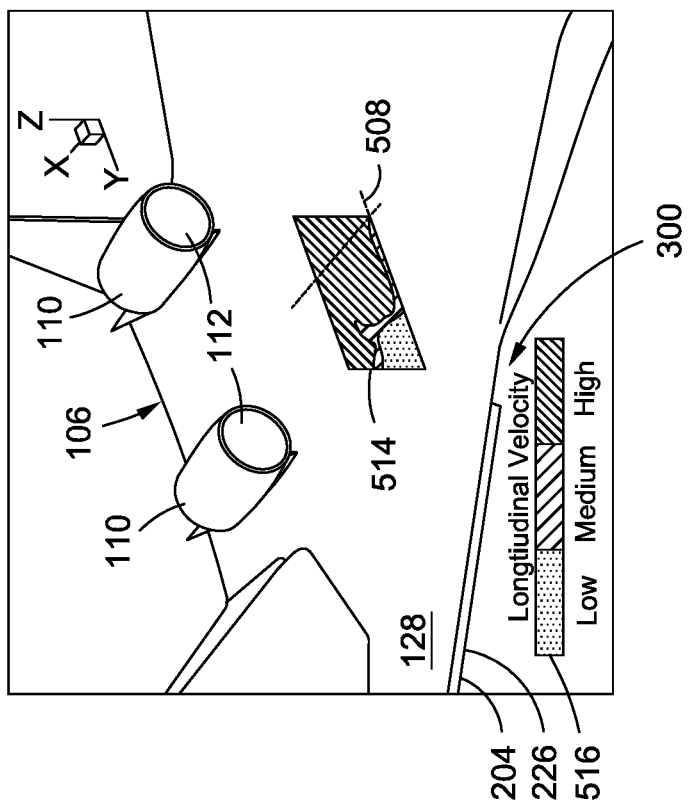
FIG. 65 is a perspective view of the blended wing body aircraft of FIG. 64 and having an end seal device, and further illustrating in the insert relatively uniform high range longitudinal velocity in the flowfield at the first fuselage station.

In FIGS. 64-65, the longitudinal velocity was measured at a first fuselage station 508 upstream of the turbine engine 110 mounted on the right-hand side of the blended wing body aircraft 106. In FIG. 64, end seal devices 400 were omitted from the blended wing body aircraft 106 in a configuration similar to the configuration of FIG. 2. The lower left-hand region of the insert 514 in FIG. 64 graphically illustrates a large area of low longitudinal velocity and which indicates the presence of a vortex 302 (FIG. 3) generated due to the discontinuity 300 (e.g., FIG. 3) located between the device end 222 (FIG. 3) on the inboard side of the Krueger flap 204 (FIG. 3). In FIG. 65, end seal devices 400 in the seal extended position 422 were installed on the inboard side of each one of the Krueger flaps 204 in a configuration similar to the configuration of FIG. 12. The insert 514 in FIG. 65 graphically illustrates a relatively large area of high speed longitudinal velocity indicating the absence of a vortex 302 due to the addition of the end seal devices 400.

Figure 67:
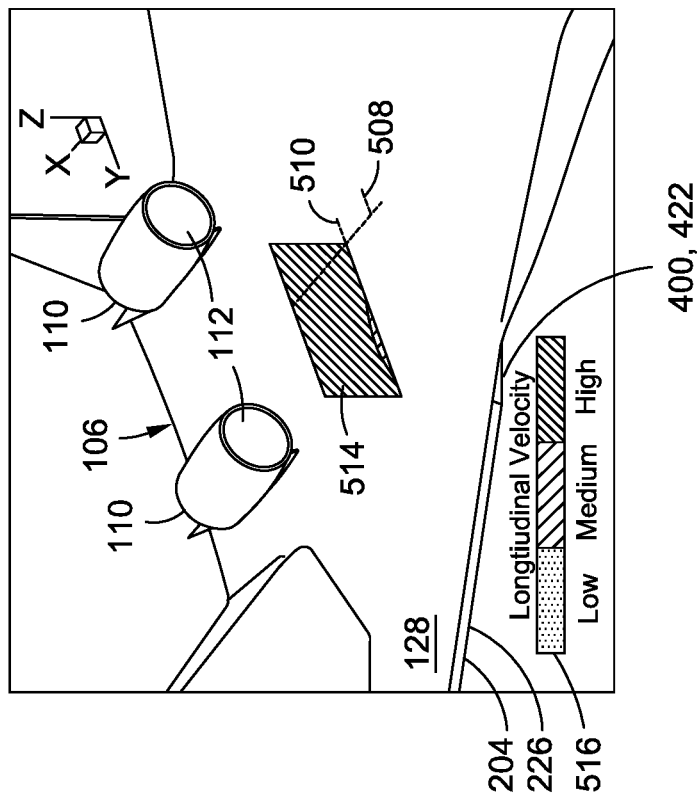
FIGS. 66-67 are perspective views of the blended wing body aircraft of FIGS. 65-65 and illustrating the longitudinal velocity in the flowfield at a second fuselage station.
Figure 66:
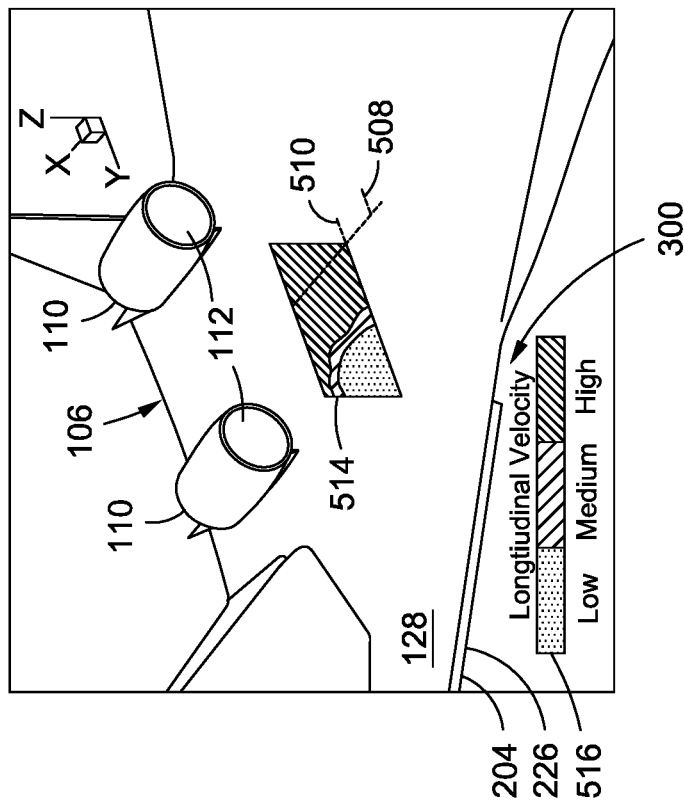

FIGS. 66-67 are views of the blended wing body aircraft 106 respectively similar to FIGS. 64-65 except that the longitudinal velocity was measured at a second fuselage station 510 located aft of the first fuselage station 508. In FIG. 66, end seal devices 400 were omitted from the blended wing body aircraft 106 and resulting in a large area of low longitudinal velocity as shown in the lower left-hand region of the insert 514 and which indicates the presence of a vortex 302. In contrast, in FIG. 67, end seal devices 400 in the seal extended position 422 were installed on the inboard sides of the Krueger flaps 204 and resulting in a relatively large area of high speed longitudinal velocity as shown in the insert 514 and which indicates the absence of a vortex 302.

Figure 69:
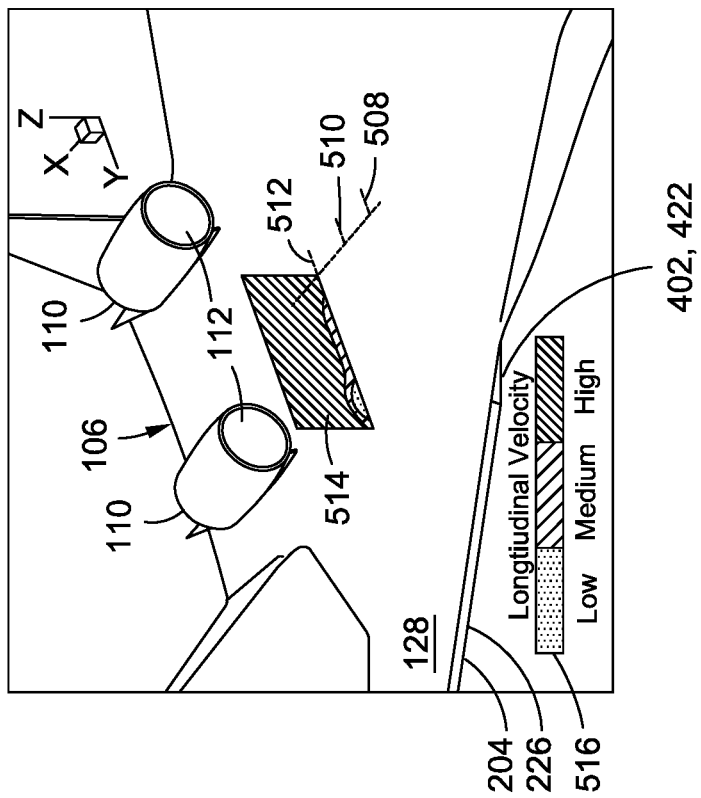
FIGS. 68-69 are perspective views of the blended wing body aircraft respectively of FIGS. 64-65 and illustrating the longitudinal velocity in the flowfield at a third fuselage station.
Figure 68:
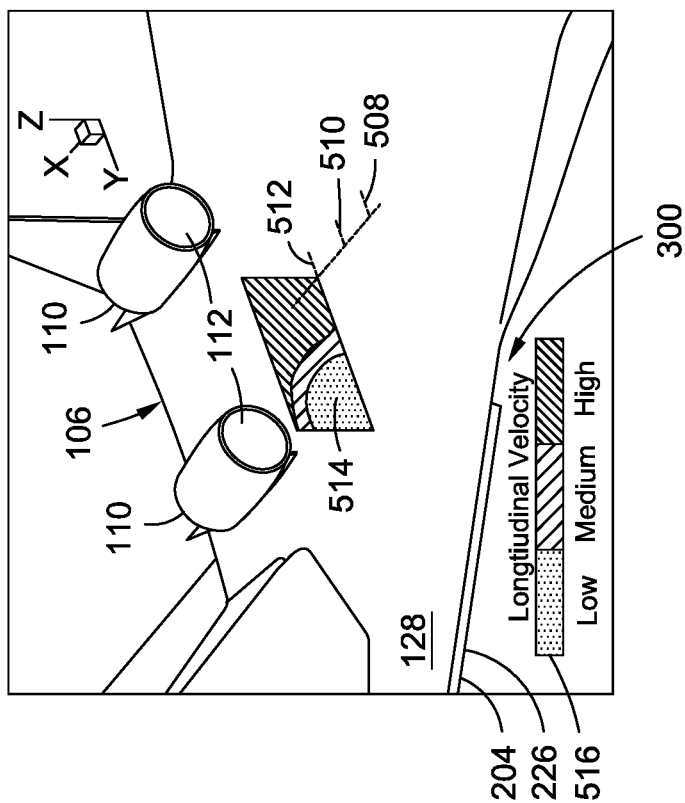

FIGS. 68-69 are respectively similar to FIGS. 66-67 except that the longitudinal velocity was measured at a third fuselage station 512 located aft of the second fuselage station 510. In FIG. 68, the area of low longitudinal velocity in the insert 514 is larger in size than in the corresponding insert 514 of FIG. 66, indicating an increase in the size (e.g., diameter) of the vortex 302 at the third fuselage station 512 relative to the size of the vortex 302 at the second fuselage station 510. In contrast, in FIG. 69, the insert 514 shows a relatively large area of high speed longitudinal velocity which indicates the absence of a vortex 302 due to the addition of end seal devices 400.

Figure 70:
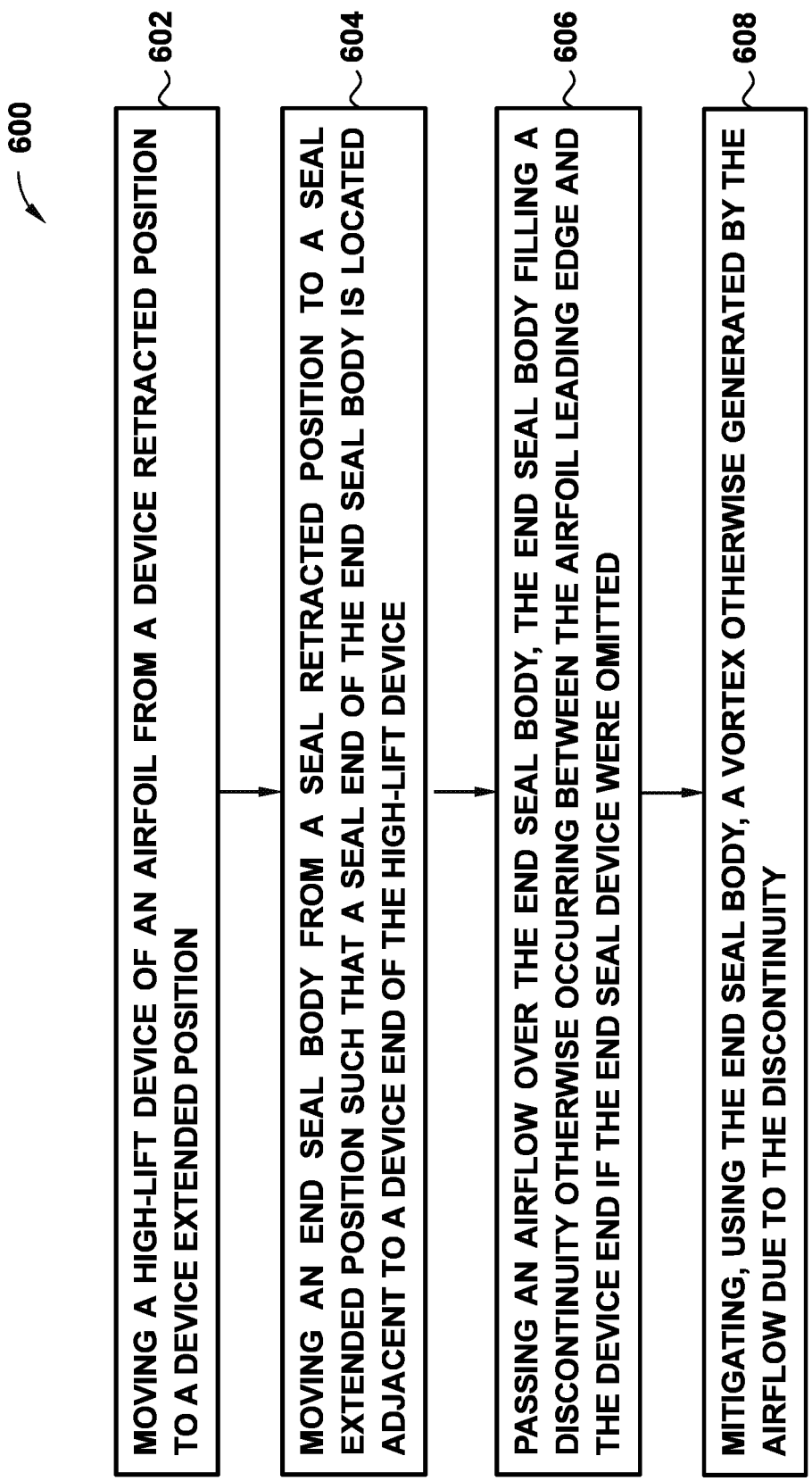
FIG. 70 is a flowchart of operations included in a method of improving the performance of an aircraft having a high-lift device coupled to an airfoil.

Referring to FIG. 70, shown is a method 600 of improving the performance of an aircraft 100 having a high-lift device 200 coupled to an airfoil 114 of the aircraft 100. The method 600 may include step 602 of moving the high-lift device 200 from a device retracted position 224 to a device extended position 226. For example, the method may include moving a leading edge slat 202 between a device retracted position 224 and a device extended position 226 as shown in FIGS. 9, 14, 20-22, and 40-42 and described above. In another example, the method may include moving a Krueger flap 204 between a device retracted position 224 and a device extended position 226 as shown in FIGS. 34-37 and described above. In a further example, the method may include actuating a morphing leading edge 206 between a device retracted position 224 and a device extended position 226 as shown in FIGS. 40-47 and described above. However, the method may include actuating other types of high-lift devices 200 between the device retracted position 224 and the device extended position 226, and is not limited to actuating a leading edge slat 202, a Krueger flap 204, or a morphing leading edge 206. In still further examples described below, the high-lift device 200 may be permanently fixed to the airfoil 114 in a device extended position 226 and may be incapable of moving to a device retracted position 224.

Step 604 of the method 600 may include moving the end seal body 402 from the seal retracted position 420 to the seal extended position 422. In the seal extended position 422, the seal end 412 of the end seal body 402 may be aligned with the device end 222 of the high-lift device 200 when in the device extended position 226. In this regard, the contour at the seal end 412 may substantially conform to or match the contour of the high-lift device 200. In some examples, the method may include moving, using a seal actuator 434, the end seal body 402 between the seal retracted position 420 and the seal extended position 422 independent of movement of the high-lift device 200 between the device retracted position 224 and the device extended position 226. For example, referring to FIGS. 8-9 and 13-14, the step 604 of moving the end seal body 402 from the seal retracted position 420 to the seal extended position 422 may include rotating the end seal body 402 about a seal pivot axis 442 as shown in FIG. 13. Rotation of the end seal body 402 about the seal pivot axis 442 may include rotating the end seal body 402 using a rotation mechanism 436 as described above. In some examples, the rotation mechanism 436 may the configured to rotate the end seal body 402 such that the seal body trailing edge 410 is maintained in contact with the airfoil upper surface 120 at least when the end seal body 402 is in the seal extended position 422 to prevent airflow therebetween.

Referring to FIGS. 20-28, in a further example, step 604 of moving the end seal body 402 from the seal retracted position 420 to the seal extended position 422 may include telescopically moving the end seal body 402 contained in the seal retracted position 420 within the high-lift device 200 along a spanwise direction at least partially out of the device end 222 of the high-lift device 200. As described above, the end seal body 402 may be contained within the high-lift device 200 in the device retracted position 224 and/or during deployment of the high-lift device 200 from the device retracted position 224 to the device extended position 226. The end seal body 402 may be telescopically moved out of the device end 222 at least until the seal body spanwise portion 404 contacts the airfoil leading edge 118 and/or an aircraft body 108 of the aircraft 100 as shown in FIG. 24. Referring to FIG. 28, telescopically moving the end seal body 402 may be performed using a telescoping actuation mechanism 444 as described above for linearly translating the end seal body 402 between the seal retracted position 420 and the seal extended position 422, as described above Referring to FIGS. 35-39 and 40-43, in a further example, step 604 of moving the end seal body 402 from the seal retracted position 420 to the seal extended position 422 may include moving the end seal body 402 in a generally chordwise direction relative to and/or over the airfoil leading edge 118 such as along the airfoil upper surface 120. For examples in which the high-lift devices 200 are configured as leading edge slats 202 as shown in FIGS. 40 and 42, movement of the end seal body 402 may be generally parallel to the direction of movement of the leading edge slat 202. In some examples, the step of moving the end seal body 402 in a generally chordwise direction may include moving the end seal body 402 using a chordwise actuation mechanism 448 including a seal actuator 434 mounted to the airfoil leading edge 118. For example, as shown in FIG. 43, the chordwise actuation mechanism 448 may include an arcuate guide track 238 and a seal actuator 434 (e.g., electric motor) for effecting chordwise movement of the end seal body 402 between the seal retracted position 420 and the seal extended position 422. For examples in which the high-lift devices 200 are configured as Krueger flaps 204 as shown in FIGS. 35-37, pivoting movement of the end seal body 402 (e.g., FIG. 38) may be performed using a seal actuator 434 as shown in FIG. 38.

In some examples, step 604 of moving the end seal body 402 between the seal retracted position 420 and the seal extended position 422 may be performed simultaneously with the movement in step 602 of the high-lift device 200 between the device retracted position 224 and the device extended position 226. For example, as shown in FIG. 39, the device end 222 of a Krueger flap 204 may be rigidly coupled to the seal end 412 of the end seal body 402 such as by using mechanical fasteners 416. Actuation of the Krueger flap 204 by the device actuator 234 may cause the end seal body 402 to be actuated in unison with the Krueger flap 204. However, in other examples, the end seal body 402 may be non-coupled to the high-lift device 200 such that the end seal body 402 may be moved independently of the high-lift device 200. In some examples, the end seal body 402 may be actuated by a seal actuator 434 independent of, but simultaneously with, actuation of the high-lift device 200 by a device actuator 234. Step 604 of moving the end seal body 402 between the seal retracted position 420 and the seal extended position 422 may be performed either before or after movement of the high-lift device 200 between the device retracted position 224 and the device extended position 226. In still further examples, the timing of the movement of the end seal body 402 between the seal retracted position 420 and/or the seal extended position 422 may at least partially overlap with timing of the movement of the high-lift device 200 between the device retracted position 224 and/or the device extended position 226.

Step 606 of the method 600 includes passing an airflow (e.g., during flight) over an end seal device 400 located adjacent to a device end 222 of a high-lift device 200 in a device extended position 226. As described above, the end seal body 402 in the seal extended position 422 is configured to fill a discontinuity 300 (FIG. 3) otherwise occurring between the airfoil leading edge 118 and the device end 222 if the end seal body 402 were omitted. As mentioned above, the seal end 412 may the in abutting and/or contacting relation to the device end 222 when the end seal body 402 is in the seal extended position 422 and the high-lift device 200 is in the device extended position 226.

Referring briefly to FIG. 18, in some examples, the method may include preventing, using an interface sealing element 414, airflow between the seal end 412 and the device end 222 at least when the end seal body 402 and the high-lift device 200 are respectively in the seal extended position 422 and the device extended position 226. As described above, the interface sealing element 414 may be a non-load-carrying element that is fixedly coupled to the seal end 412 and/or to the device end 222. The interface sealing element 414 may be formed of a resiliently compressible material that prevents airflow between the seal end 412 and the device end 222 which may otherwise disrupt the airflow and potentially cause the formation of a small vortex 302.

Referring briefly to FIGS. 24-27, in some examples, the method may include preventing, using a gap sealing element 430, airflow between the seal body spanwise portion 404 of an end seal body 402 and the airfoil upper surface 120 of the airfoil 114, at least when the end seal body 402 is in the seal extended position 422. Such airflow between the seal body spanwise portion 404 and the airfoil upper surface 120 may disrupt normal airflow over the airfoil 114. As mentioned above, the gap sealing element 430 may extend along the seal body spanwise portion 404 on the inner surface of the end seal body 402 and may be coupled to the end seal body 402 via bonding and/or mechanical fastening. In one example, a gap sealing element 430 may be included on the slat configuration of the end seal body 402 as shown in FIGS. 25-27, 41 and 43. The gap sealing element 430 may seal a gap 429 (e.g., FIG. 43) occurring between the seal body spanwise portion 404 and the airfoil upper surface 120, and may be used in conjunction with high-lift devices 200 configured to form a gap 429 (FIG. 42) between the high-lift device 200 and the airfoil upper surface 120 when the high-lift device is in the device extended position as shown in FIG. 42 and described above.

Referring briefly to FIGS. 52-62, in some examples, the high-lift device 200 may be non-movable and may be permanently fixed in the device extended position 226. For example, FIGS. 52-57 illustrate a leading edge cuff 218 that may be permanently fixed in the device extended position 226 on the airfoil leading edge 118. FIGS. 58-62 illustrate a fixed slot 216 that may be permanently fixed in the device extended position 226 on the airfoil leading edge 118. For aircraft 100 having high-lift devices 200 that are permanently fixed in the device extended position 226, the end seal body 402 may optionally be fixed in the seal extended position 422 and may be incapable of being moved into a seal retracted position 420. As shown in FIGS. 52-62, such end seal devices 400 may be integrally formed with or fixedly mounted to the airfoil 114 and/or to a device end 222 of a high-lift device 200 and may thereby fill a discontinuity 300 that would otherwise occur between the airfoil leading edge 118 and the device end 222 of the high-lift device 200.

Step 608 of the method 600 includes mitigating, using an end seal device 400, a vortex 302 generated by the airflow due to the discontinuity 300 (FIG. 3) otherwise occurring between the seal end 412 and the laterally adjacent portion of the airfoil leading edge 118 and/or aircraft body 108. Advantageously, as discussed above and as graphically illustrated in FIGS. 64-69, the end seal body 402 may fill the discontinuity 300 and thereby create a smooth, non-abrupt transition between the device end 222 and the portion of the airfoil leading edge 118 and/or aircraft body 108. By filling the discontinuity 300, the end seal body 402 may prevent the formation of a vortex 302. In addition, the end seal body 402 may prevent or reduce disruption of the airflow that may otherwise occur due to the discontinuity 300. As is graphically illustrated in FIG. 63, for an aircraft 100 having high-lift devices 200 in a device extended position 226, the addition of end seal devices 400 may result in a significant increase in maximum lift coefficient relative to the maximum lift coefficient of an aircraft 100 for which the end seal devices 400 are omitted.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. An end seal device for a high-lift device on an airfoil leading edge of an airfoil of an aircraft having an aircraft body, comprising:
an end seal body configured to be coupled to the airfoil and having a seal body spanwise portion and a seal end;
wherein:
the end seal body configured to be in a seal extended position when the high-lift device is in a device extended position;
the seal body spanwise portion being disposed adjacent to the aircraft body or airfoil leading edge and the seal end being disposed adjacent to a device end of the high-lift device when the end seal body is in the seal extended position and the high-lift device is in the device extended position, the end seal body in the seal extended position filling a discontinuity otherwise occurring between the device end and the aircraft body or airfoil leading edge if the end seal body were omitted;
the end seal body is configured to move from the seal retracted position to the seal extended position according to one of:
rotation of the end seal body about a seal pivot axis located at a pivot end of the end seal body, the seal pivot axis oriented perpendicular to a spanwise direction of the end seal body; and
spanwise telescoping of the end seal body from the seal retracted position in which the end seal body is fully contained within the high-lift device.

2. The end seal device of claim 1, wherein:
the seal end is configured to be directly coupled to the device end.

3. The end seal device of claim 1, wherein:
the end seal body is configured to be non-coupled to the high-lift device such that the end seal body moves independently of the high-lift device.

4. The end seal device of claim 1, wherein:
the end seal body in the seal extended position has a contour at the seal end that is complementary to a contour of the high-lift device in the device extended position at the device end.

5. The end seal device of claim 1, further including:
an interface sealing element located between the seal end and the device end and configured to prevent airflow therebetween at least when the end seal device and the high-lift device are respectively in the seal extended position and the device extended position.

6. The end seal device of claim 1, further including:
a gap sealing element extending along the seal body spanwise portion and configured to seal the seal body spanwise portion to an airfoil upper surface at least when the end seal body is in the seal extended position.

7. The end seal device of claim 1, wherein:
the end seal body is configured to be in a seal retracted position when the high-lift device is in a device retracted position.

8. The end seal device of claim 7, further including:
a seal actuator configured to move the end seal body between the seal retracted position and the seal extended position.

9. An aircraft, comprising:
an aircraft body;
at least one airfoil having a high-lift device on an airfoil leading edge;
an end seal device, including:
an end seal body configured to be coupled to the airfoil and having a seal body spanwise portion and a seal end;
the end seal body configured to be in a seal extended position when the high-lift device is in a device extended position;
the seal body spanwise portion being disposed adjacent to the aircraft body or airfoil leading edge and the seal end being disposed adjacent to a device end of the high-lift device when the end seal body is in the seal extended position and the high-lift device is in the device extended position, the end seal body in the seal extended position filling a discontinuity otherwise occurring between the device end and the aircraft body or airfoil leading edge if the end seal body were omitted;
wherein:
the end seal body is configured to move from the seal retracted position to the seal extended position according to one of:
rotation of the end seal body about a seal pivot axis located at a pivot end of the end seal body, the seal pivot axis oriented perpendicular to a spanwise direction of the end seal body; and
spanwise telescoping of the end seal body from the seal retracted position in which the end seal body is fully contained within the high-lift device.

10. The aircraft of claim 9, wherein:
the aircraft is one of a tube-and-wing aircraft and a blended wing body aircraft.

11. The aircraft of claim 9, wherein:
the at least one airfoil comprises a pair of wings each having at least one high-lift device; and
the aircraft has at least one turbine engine having an engine inlet located downstream of the pair of wings.

12. The aircraft of claim 9, wherein:
the high-lift device is one of a leading edge slat, a Krueger flap, a fixed slot, or a morphing leading edge.

13. A method of improving performance of an aircraft having an aircraft body and a high-lift device coupled to an airfoil, comprising:
- moving an end seal body from a seal retracted position to a seal extended position by performing one of the following:
  - rotating the end seal body about a seal pivot axis located at a pivot end of the end seal body, the seal pivot axis oriented perpendicular to a spanwise direction of the end seal body;
  - telescopically moving the end seal body from the seal retracted position in which the end seal body is fully contained within the high-lift device;
  - wherein the end seal body is located adjacent to a device end of the high-lift device in a device extended position, the end seal body in the seal extended position filling a discontinuity otherwise occurring between the device end and the aircraft body or airfoil leading edge if the end seal body were omitted;
- passing an airflow over the end seal body; and
- mitigating, using the end seal body, a vortex otherwise generated by the airflow due to the discontinuity.

14. The method of claim 13, further including:
- preventing, using an interface sealing element, airflow between a seal end of the end seal body and the device end of the high-lift device at least when the end seal body and the high-lift device are respectively in the seal extended position and the device extended position.

15. The method of claim 13, further including:
- preventing, using a gap sealing element, airflow between a seal spanwise portion and an airfoil upper surface at least when the end seal body is in the seal extended position.

16. The method of claim 13, wherein:
- the high-lift device is one of a leading edge slat, a Krueger flap, a fixed slot, or a morphing leading edge.

17. The method of claim 13, further including, prior to passing the airflow over the end seal body, the step of:
- moving the high-lift device from a device retracted position to the device extended position.

18. The method of claim 17, wherein the step of moving the end seal body from the seal retracted position to the seal extended position comprises:
- moving the end seal body between the seal retracted position and the seal extended position independent of movement of the high-lift device between the device retracted position and the device extended position.

19. The method of claim 17, wherein:
- moving the end seal body between the seal retracted position and the seal extended position is performed simultaneously with movement of the high-lift device between the device retracted position and the device extended position.

20. The method of claim 17, wherein:
- moving the end seal body between the seal retracted position and the seal extended position is performed either before or after movement of the high-lift device between the device retracted position and the device extended position.

* * * * *